US007543606B2

(12) United States Patent
Friedline et al.

(10) Patent No.: US 7,543,606 B2
(45) Date of Patent: Jun. 9, 2009

(54) METHODS FOR SUPPORTING CONDUITS IN A SANITARY ENVIRONMENT

(75) Inventors: Gary W. Friedline, New Alexandria, PA (US); Robert S. Chappo, Jr., West Mifflin, PA (US); Kenneth R. Graham, Youngwood, PA (US)

(73) Assignee: Stauff Corporation, Waldwick, NJ (US)

( * ) Notice: Subject to any disclaimer, the term of this patent is extended or adjusted under 35 U.S.C. 154(b) by 52 days.

(21) Appl. No.: 11/311,551

(22) Filed: Dec. 19, 2005

(65) Prior Publication Data
US 2006/0090805 A1    May 4, 2006

Related U.S. Application Data

(62) Division of application No. 10/931,837, filed on Sep. 1, 2004, now Pat. No. 7,195,038, which is a division of application No. 10/464,196, filed on Jun. 18, 2003, now Pat. No. 6,799,607.

(51) Int. Cl.
*F16L 3/00* (2006.01)
*E21F 17/02* (2006.01)

(52) U.S. Cl. .................. 138/106; 138/108; 138/107; 248/62; 248/59

(58) Field of Classification Search ................ 138/106, 138/108, 107, 110, 112, 113; 248/62, 49, 248/58, 59, 317, 74.1–74.4
See application file for complete search history.

(56) References Cited

U.S. PATENT DOCUMENTS

| 92,299 | A | 7/1869 | Fry |
| 485,033 | A | 10/1892 | Hanna |
| 720,296 | A | 2/1903 | Straub |
| 784,979 | A | 3/1905 | Bruce |
| 801,409 | A | 10/1905 | Smith |
| 824,544 | A | 6/1906 | Hossege |
| 936,438 | A | 10/1909 | Fitz Gerald |
| 1,025,243 | A | 5/1912 | Carpenter et al. |
| 1,158,633 | A | 11/1915 | Carpenter et al. |

(Continued)

FOREIGN PATENT DOCUMENTS

DE    2854924 A1    6/1980

(Continued)

OTHER PUBLICATIONS

Bioprocessing Equipment, ASME BPE-2002, Journal, 2002, p. 9-13, 37, and 38 American Society of Mechanical Engineers.

(Continued)

*Primary Examiner*—Patrick F Brinson
(74) *Attorney, Agent, or Firm*—K&L Gates LLP

(57) ABSTRACT

Methods for supporting conduits within a sanitary environment. Various methods may comprise supporting a first conduit support relative to a structure such that the conduit support does not present or form a horizontal surface whereon contaminants are able to accumulate thereon due to gravity and supporting a portion of a conduit within the conduit support. Other methods involve attaching or suspending one or more additional conduit supports for supporting other conduits such that other conduit supports do not present or form horizontal surfaces whereon contaminants are able to accumulate thereon due to gravity.

4 Claims, 15 Drawing Sheets

U.S. PATENT DOCUMENTS

| | | |
|---|---|---|
| 1,196,930 A | 9/1916 | Carpenter et al. |
| 1,320,828 A | 11/1919 | Bilbrough |
| 1,322,414 A | 11/1919 | Elkins |
| 1,480,147 A | 1/1924 | Brandt |
| 1,906,209 A | 4/1933 | Harding et al. |
| 2,335,296 A | 11/1943 | Miller |
| 2,339,565 A | 1/1944 | Goldberg et al. |
| 2,354,919 A | 8/1944 | Lockwood |
| 2,355,742 A | 8/1944 | Morehouse |
| 2,356,318 A | 8/1944 | Hayman |
| 2,361,943 A | 11/1944 | Issoglio et al. |
| 2,362,124 A | 11/1944 | Ellinwood |
| 2,404,531 A | 7/1946 | Robertson |
| 2,425,033 A | 8/1947 | Fletcher |
| 2,442,833 A | 6/1948 | Watkins |
| 2,676,036 A | 4/1954 | Arrowood |
| D172,741 S | 8/1954 | Cooper |
| 2,705,158 A | 3/1955 | Risley ................ 285/47 |
| 2,712,167 A | 7/1955 | Blanchard |
| 2,861,762 A | 11/1958 | Gunthel, Jr. |
| 2,890,848 A | 6/1959 | Johnson, Jr. |
| 2,937,835 A | 5/1960 | Csmereka |
| D188,377 S | 7/1960 | Martin |
| D190,680 S | 6/1961 | Sakhnoffsky |
| 3,128,073 A | 4/1964 | Berlyn |
| 3,186,051 A | 6/1965 | Waddell |
| 3,188,030 A | 6/1965 | Fischer |
| 3,244,388 A | 4/1966 | Coffman |
| 3,266,761 A | 8/1966 | Walton et al. |
| 3,273,837 A | 9/1966 | Willert et al. |
| 3,292,221 A | 12/1966 | Baugh |
| 3,330,517 A | 7/1967 | Zimmermann |
| 3,334,938 A | 8/1967 | Sentz |
| 3,367,358 A * | 2/1968 | Rentschler .............. 137/375 |
| 3,376,003 A | 4/1968 | Zimmermann |
| 3,382,630 A | 5/1968 | Chivers |
| 3,523,667 A | 8/1970 | Guerrero |
| 3,523,668 A | 8/1970 | Logsdon |
| 3,530,899 A | 9/1970 | Breeding |
| 3,531,071 A | 9/1970 | Kubli |
| 3,539,137 A | 11/1970 | March |
| 3,559,910 A | 2/1971 | Babb |
| 3,565,375 A | 2/1971 | Babb |
| 3,572,662 A | 3/1971 | Weaver |
| 3,575,214 A | 4/1971 | Bindel |
| 3,582,029 A | 6/1971 | Moesta |
| 3,606,218 A | 9/1971 | Enlund et al. |
| 3,633,947 A | 1/1972 | Nelson |
| 3,695,563 A | 10/1972 | Evans |
| 3,800,370 A | 4/1974 | Courtright |
| 3,848,839 A | 11/1974 | Tillman |
| 3,851,979 A | 12/1974 | Becker |
| 3,856,246 A | 12/1974 | Sinko |
| 3,888,439 A | 6/1975 | Tuttle |
| 3,914,100 A | 10/1975 | Guskea |
| 3,944,175 A | 3/1976 | Kearney |
| 4,004,766 A | 1/1977 | Long |
| 4,025,131 A | 5/1977 | Bergquist et al. |
| 4,043,333 A | 8/1977 | Munsch |
| D247,420 S | 3/1978 | Reynolds |
| 4,121,796 A | 10/1978 | Forbes |
| 4,134,563 A | 1/1979 | Pollono |
| 4,146,203 A | 3/1979 | Williams |
| 4,180,286 A | 12/1979 | Ginter, Jr. ............. 285/328 |
| 4,202,520 A | 5/1980 | Loos et al. |
| 4,219,051 A | 8/1980 | D'Haeyer |
| 4,221,239 A * | 9/1980 | Reale ................ 138/149 |
| 4,262,869 A | 4/1981 | Menshen |
| 4,270,250 A | 6/1981 | Schön |
| D263,415 S | 3/1982 | Roche |
| 4,386,630 A * | 6/1983 | Gapinski ................ 138/149 |
| 4,388,749 A | 6/1983 | Sassak |
| 4,397,437 A | 8/1983 | Madej |
| 4,411,460 A | 10/1983 | Beal |
| 4,415,188 A | 11/1983 | Ginter, Jr. ............. 285/420 |
| 4,442,990 A | 4/1984 | Krueger |
| 4,444,370 A | 4/1984 | Krueger |
| D273,938 S | 5/1984 | Piper |
| 4,478,381 A | 10/1984 | Pittion et al. |
| 4,506,418 A | 3/1985 | Viola et al. |
| 4,552,390 A | 11/1985 | Calmettes |
| D283,486 S | 4/1986 | Fogel et al. |
| 4,595,162 A | 6/1986 | Matsumura et al. |
| 4,618,114 A | 10/1986 | McFarland |
| 4,653,542 A | 3/1987 | Tascher |
| 4,666,109 A | 5/1987 | Fallon et al. |
| 4,687,027 A * | 8/1987 | Magera ................ 138/149 |
| 4,699,177 A | 10/1987 | Thomas |
| 4,728,071 A | 3/1988 | Salacuse |
| 4,765,577 A | 8/1988 | Collins |
| 4,784,363 A | 11/1988 | Brown et al. |
| 4,858,860 A | 8/1989 | Richards |
| 4,912,287 A | 3/1990 | Ono et al. |
| D307,541 S | 5/1990 | Tres |
| 4,930,732 A | 6/1990 | Hardtke |
| D309,094 S | 7/1990 | Donis et al. |
| 5,007,604 A | 4/1991 | Richards |
| 5,014,940 A | 5/1991 | Sherman |
| 5,048,776 A | 9/1991 | Weiss |
| 5,098,047 A | 3/1992 | Plumley |
| 5,112,031 A | 5/1992 | Hynds et al. |
| 5,154,382 A | 10/1992 | Hoshino |
| 5,165,453 A | 11/1992 | Walker, Jr. |
| 5,192,039 A | 3/1993 | Williams |
| 5,205,022 A | 4/1993 | Norton |
| 5,215,281 A | 6/1993 | Sherman |
| 5,221,064 A | 6/1993 | Hodges |
| 5,240,294 A | 8/1993 | Corcoran |
| D339,737 S | 9/1993 | Hostetler |
| 5,269,486 A | 12/1993 | Hufford |
| 5,271,588 A | 12/1993 | Doyle |
| D344,672 S | 3/1994 | Current |
| 5,305,978 A | 4/1994 | Current |
| 5,350,141 A | 9/1994 | Perrault et al. |
| 5,377,939 A | 1/1995 | Kirma |
| 5,381,833 A | 1/1995 | Cummings |
| 5,395,079 A | 3/1995 | Jensen et al. |
| 5,404,914 A | 4/1995 | Ziu |
| 5,443,232 A | 8/1995 | Kesinger et al. |
| 5,503,353 A | 4/1996 | Degand |
| 5,518,351 A | 5/1996 | Peil |
| 5,542,631 A | 8/1996 | Bruno |
| 5,553,975 A | 9/1996 | Elkins |
| D376,974 S | 12/1996 | Chen |
| 5,593,115 A | 1/1997 | Lewis |
| 5,617,820 A | 4/1997 | Beardmore et al. |
| 5,639,993 A | 6/1997 | Ideno et al. |
| 5,651,519 A | 7/1997 | Goodrich et al. |
| D382,195 S | 8/1997 | Ekern |
| 5,743,302 A | 4/1998 | McNeely |
| 5,779,283 A | 7/1998 | Kimura et al. |
| D396,801 S | 8/1998 | Petty |
| 5,794,897 A | 8/1998 | Jobin et al. |
| 5,816,736 A | 10/1998 | Kroulik |
| 5,832,164 A | 11/1998 | Miekis |
| 5,845,037 A | 12/1998 | Miekis |
| 5,865,474 A | 2/1999 | Takahashi |
| 5,873,522 A | 2/1999 | Roberts |
| 5,876,000 A | 3/1999 | Ismert |
| 5,885,034 A | 3/1999 | Fergusson |
| D408,727 S | 4/1999 | Sherman |
| 5,906,341 A | 5/1999 | Brown |
| 5,931,423 A | 8/1999 | Heideloff |
| 5,971,663 A | 10/1999 | Brothers |

| | | | |
|---|---|---|---|
| 5,979,839 A | 11/1999 | Horn et al. | |
| 5,984,243 A | 11/1999 | Pfaller et al. | |
| 5,992,802 A | 11/1999 | Campbell | |
| D422,204 S | 4/2000 | Holloway et al. | |
| 6,079,673 A | 6/2000 | Cox | |
| 6,102,341 A | 8/2000 | Ball | |
| 6,105,216 A | 8/2000 | Opperthauser | |
| 6,126,119 A | 10/2000 | Giangrasso | |
| 6,126,122 A | 10/2000 | Ismert | |
| 6,142,428 A | 11/2000 | Kamata et al. | |
| 6,145,896 A | 11/2000 | Vitel et al. | |
| 6,146,050 A | 11/2000 | Marshall | 403/400 |
| 6,161,589 A | 12/2000 | Bolotte et al. | |
| D436,028 S | 1/2001 | Wagner et al. | |
| D438,783 S | 3/2001 | Elliott | |
| 6,234,277 B1 | 5/2001 | Kaczmarek | |
| D448,657 S | 10/2001 | Calvert | |
| 6,301,735 B1 | 10/2001 | Jartoux et al. | |
| 6,349,807 B1 | 2/2002 | Northup et al. | |
| 6,431,502 B1 | 8/2002 | Goodman | |
| 6,460,231 B2 | 10/2002 | Bourgerie | |
| 6,536,717 B2 | 3/2003 | Parker | |
| 6,669,150 B2 | 12/2003 | Benoit et al. | |
| D485,159 S | 1/2004 | Junkers | |
| 6,685,144 B1 | 2/2004 | Wochnick | |
| 6,691,742 B1 | 2/2004 | Cooper | |
| D489,000 S | 4/2004 | Ellery | |
| 6,761,189 B2 | 7/2004 | Berninger et al. | |
| 6,799,607 B1 | 10/2004 | Friedline et al. | |
| D499,957 S | 12/2004 | Friedline et al. | |
| 6,848,464 B2 | 2/2005 | Ransom | |
| D516,415 S | 3/2006 | Friedline et al. | |
| D516,416 S | 3/2006 | Friedline et al. | |
| D516,903 S | 3/2006 | Friedline et al. | |
| 7,195,038 B2 | 3/2007 | Friedline et al. | 138/106 |
| 2002/0000499 A1 | 1/2002 | Aoki et al. | |
| 2002/0030144 A1 | 3/2002 | Blane et al. | |
| 2002/0066835 A1 | 6/2002 | Sentpali et al. | |
| 2002/0088905 A1 | 7/2002 | Hansen | |
| 2002/0104930 A1 | 8/2002 | Attee | |
| 2002/0113173 A1 | 8/2002 | Bass | |
| 2002/0153459 A1 | 10/2002 | Maurice | |
| 2002/0158171 A1 | 10/2002 | Karlinger | |
| 2003/0106968 A1 | 6/2003 | Terrill et al. | |
| 2005/0017133 A1 | 1/2005 | Wochnick | |
| 2005/0061925 A1 | 3/2005 | Kirschner | |
| 2005/0205722 A1 | 9/2005 | Krueger | |
| 2006/0090806 A1 | 5/2006 | Friedline et al. | 138/106 |
| 2006/0090807 A1 | 5/2006 | Friedline et al. | 138/106 |
| 2008/0053549 A1 | 3/2008 | Friedline et al. | |

FOREIGN PATENT DOCUMENTS

| | | |
|---|---|---|
| DE | 3146297 A1 | 6/1983 |
| DE | 3233838 A1 | 3/1984 |
| DE | 3439418 A1 | 5/1986 |
| DE | 3506251 A1 | 8/1986 |
| DE | 29814418 U1 | 10/1998 |
| DE | 19811889 A1 | 9/1999 |
| EP | 0225516 A2 | 6/1987 |
| EP | 0567821 B1 | 11/1993 |
| EP | 0602456 B1 | 6/1994 |
| EP | 0622575 B1 | 11/1994 |
| FR | 2572488 | 5/1986 |
| FR | 2631678 | 11/1989 |
| GB | 2037921 A | 7/1980 |
| GB | 2124289 A | 2/1984 |
| JP | 4-81562 | 3/1992 |
| WO | WO 2005/072393 A3 | 8/2005 |

OTHER PUBLICATIONS

Pipe Hangers and Supports—Materials, Design and Manufacture, MSS-SP-58-1993, 1993, pp. 2-5 and 8, Manufacturers Standardization Society of the Valve and Fitting Industry, Vienna, Virginia.
Pipe Hangers and Supports—Selection and Application, MSS SP-69-2002, 2002, pp. 1, 2 and 7-9, Manufacturers Standardization Society of the Valve and Fittings Industry, Inc., Vienna, Virginia.
The Best Solution For Process Piping Installations, 4 pages, Jan. 2, 2004, Behringer, Branchville, N.J.
International Preliminary Report on Patentability for PCT/US2005/002634 dated Nov. 14, 2006, 6 pages.
Written Opinion of the International Searching Authority for PCT/US2005/002634 dated Oct. 16, 2006, 5 pages.
International Search Report for PCT/US2005/002634 dated Oct. 16, 2006, 3 pages.
"Grinnell Pipe Hangers Catalog PH-90," Grinnell Corporation, 1990, pp. 1-175.
"Caddy Superfix 454," flier, Erico International Corporation, 2005, 1 page.
R&R Custom Aluminum Connecting Rods for *any* application, http://web.archive.org/web/20030423120916/http://www.rrconnectingrods.com/, Apr. 14, 2003, 2 pages.
"Victaulic Mechanical Piping Systems General Catalog," The Victaulic System, Victaulic Company of America, pp. 8-9, 11-17, 39, 45, 53, 56, and 87.
"Save and vibration-absorbing: Steel tube-clamp. Space-saving system. Can be welded afterwards. Allows vibration-free laying and mounting of tubes," RSB Tube Clams Fastening Systems, 2000, 5 pages.
"An American National Standard: Bioprocessing Equipment," ASME BPE-2002 (Revision of ASME BPE-1997), 2002, pp. iii-88.
"USS Susport: For Suspension and Support of Stainless Steel, Plastic and Glass Pipe and Tubing," Bulletin SPHS, Universal Suspension Systems, Inc., 1983, 6 pages.
"Copper Tubing Hangers," Anvil International, Inc., pp. PH-16-PH-18; PH-22-PH-24.
"Now from Tri-Clover . . . ", Bulletin WPS-91, 1 page.
"Pipe & Tubing Hangers <for clean work areas and clean rooms>," PBM Valve Solutions, Irwin Pennsylvania, Nov. 2004, pp. 1-9.

\* cited by examiner

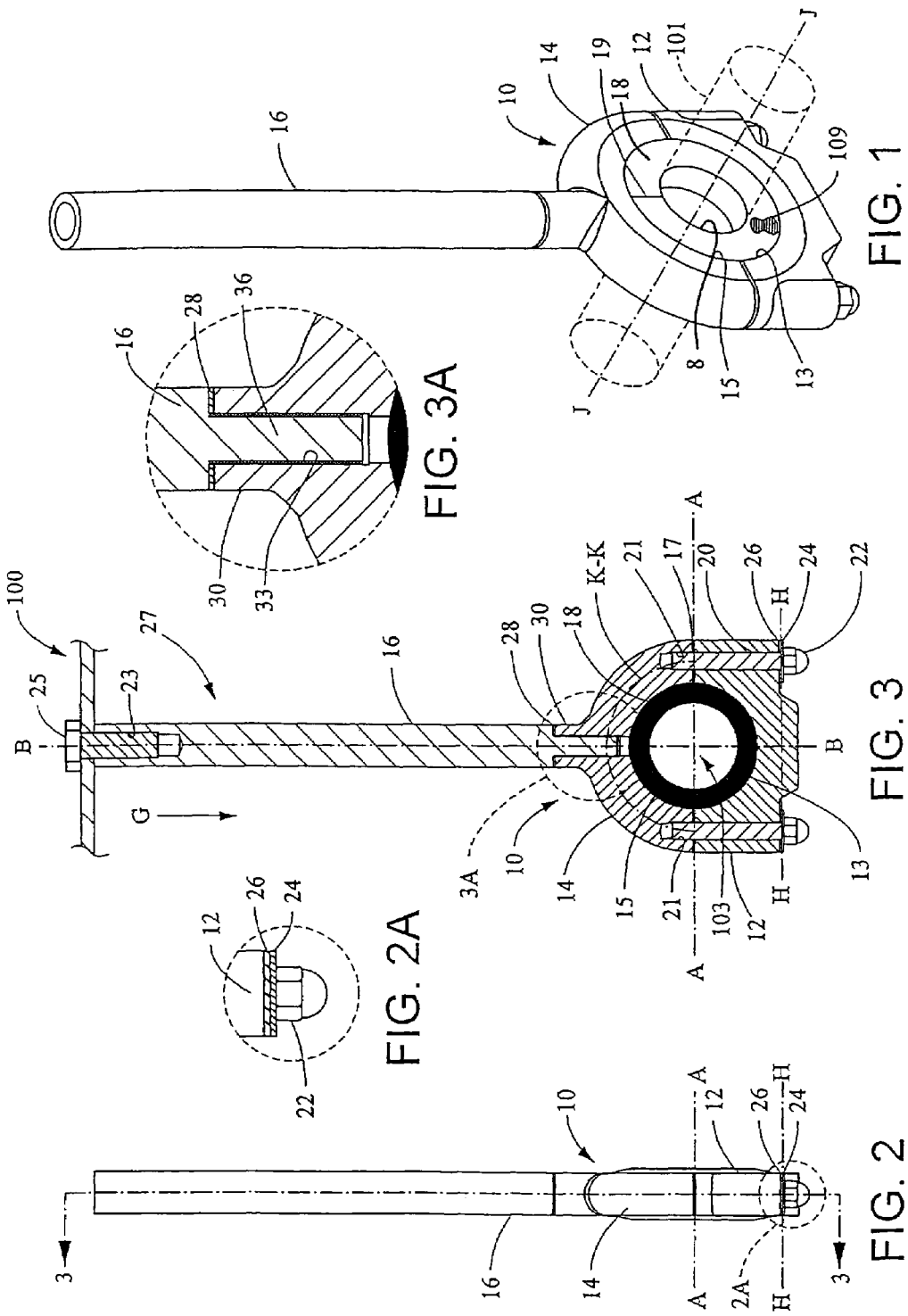

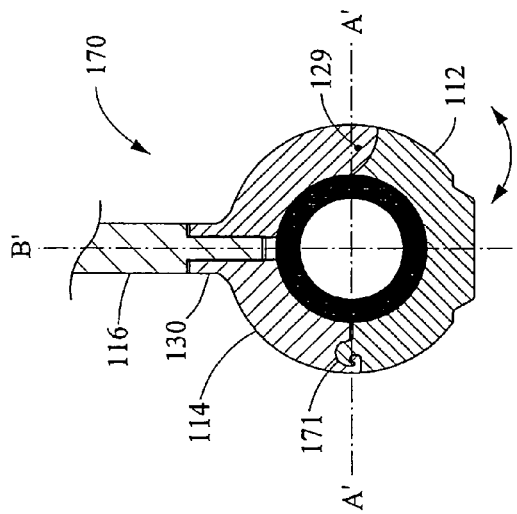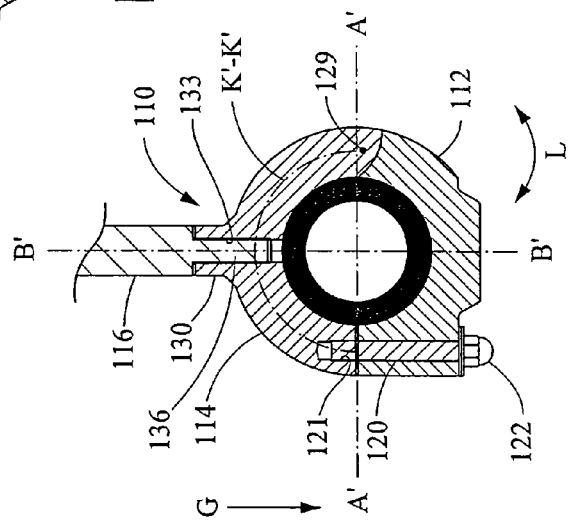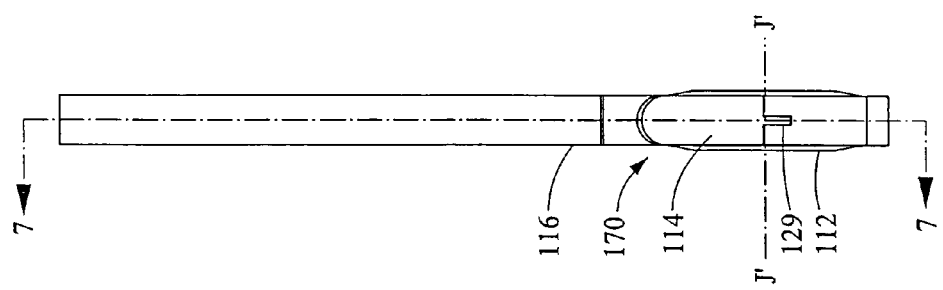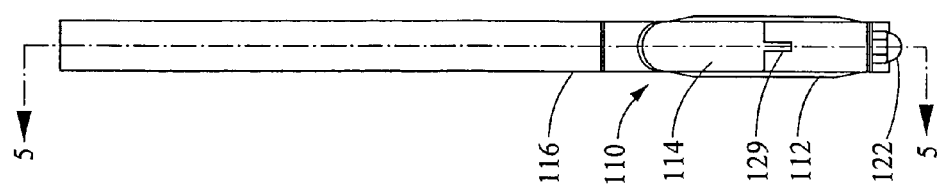

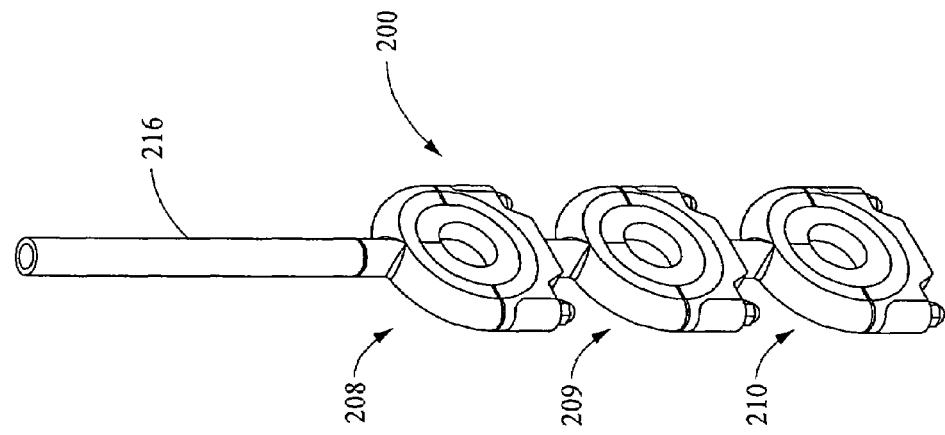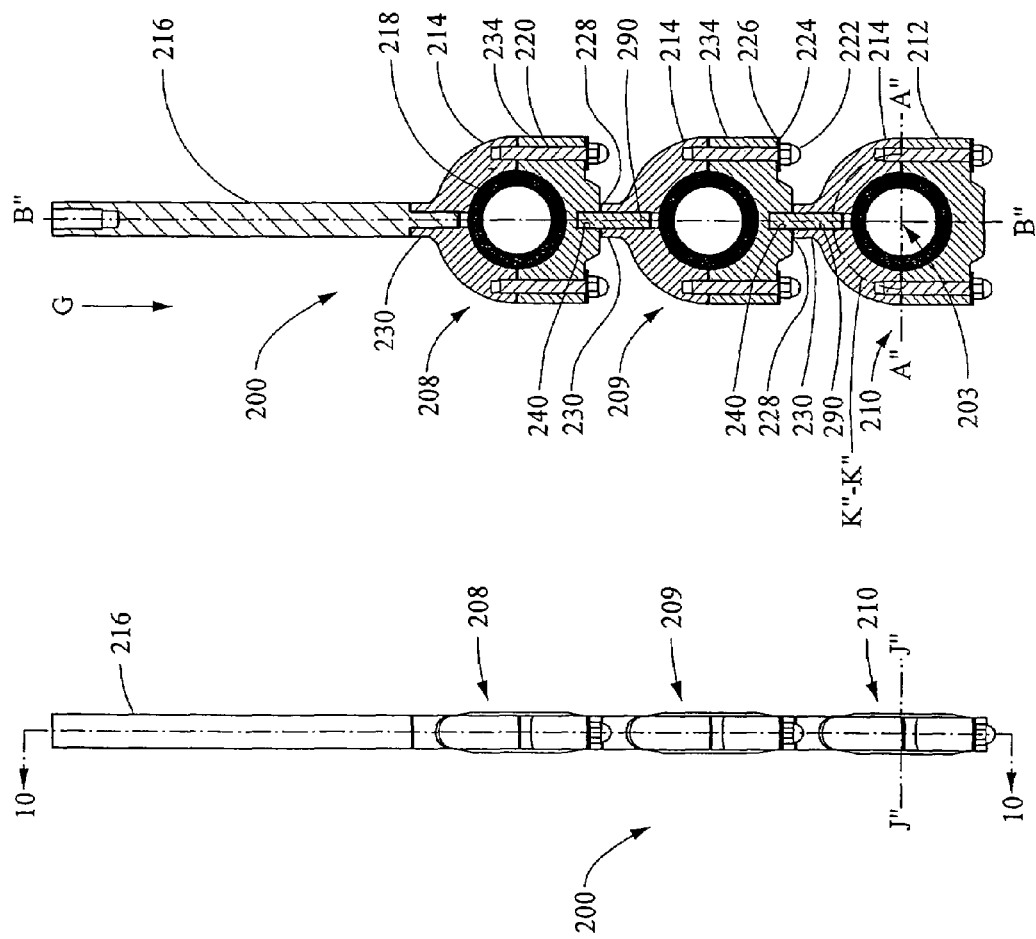

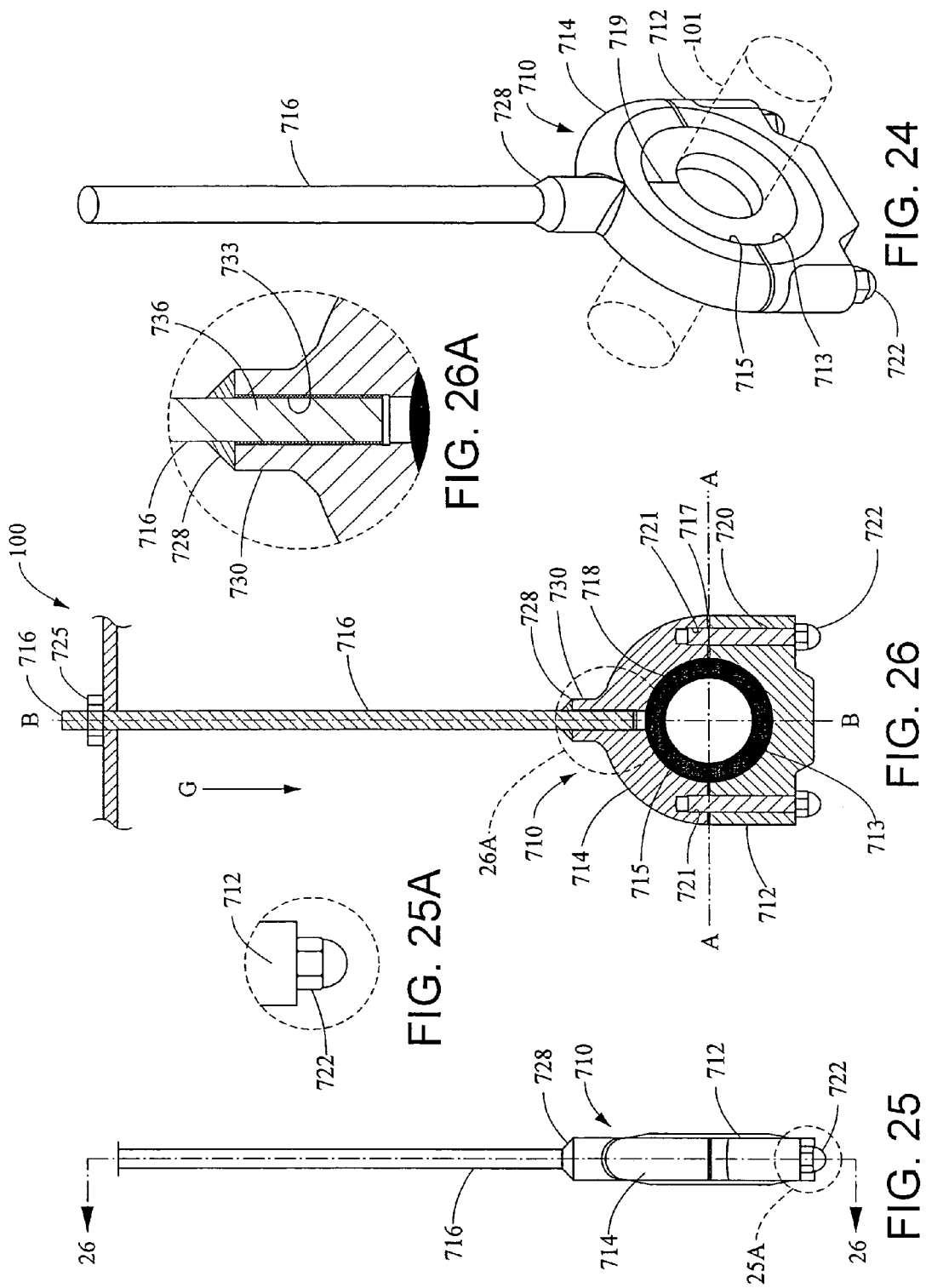

METHODS FOR SUPPORTING CONDUITS IN A SANITARY ENVIRONMENT

CROSS-REFERENCE TO RELATED APPLICATIONS

This non-provisional application for patent is a divisional patent application of U.S. patent application Ser. No. 10/931,837, filed Sep. 1, 2004 now U.S. Pat. No. 7,195,038, which is a divisional patent application of U.S. patent application Ser. No. 10/464,196, filed Jun. 18, 2003, now U.S. Pat. No. 6,799,607, the disclosures of which are herein incorporated by reference in their entirety.

BACKGROUND OF THE INVENTION

1. Field of the Invention

The subject invention relates to sanitary support systems and methods and, more particularly, to devices and methods for supporting pipes and other conduits typically within a sanitary environment.

2. Description of the Invention Background

Conduit supports, or pipe hangers and clamps, are well known and commonly used to support and hang pipes from support structures such as ceilings, joists or rafters of buildings. Typically several supports or hangers are employed along a stretch of conduit to suspend the conduit from the support structure. These pipe hangers are primarily secured to the support structure and then attached to the pipe to support the pipe in a desired orientation.

Over the years, many improvements, devices and methods for supporting conduits have been made. Many pipe hanger designs focused on the efficiency and simplicity of utilizing the pipe hanger when employing the hanger in a desired orientation. Others allowed for pipe expansion and/or vibration due to the materials carried within the pipe itself. Another focus of improvements involved creating a versatile pipe hanger that could accommodate a large variety of pipes, or a large number of pipes with a single hanger. Although many of these pipe hangers are still employed, there remains a need for a pipe hanger that, among other things, accommodates the requirements of the surrounding environment, such as those peculiar to sanitary environments.

Prior methods of insulating techniques have been used in connection with piping systems. Those methods, however, do not serve to cover the hanger leaving it exposed to trap dirt and debris.

Environments where sanitary conditions must be maintained may involve manufacturing operations wherein cleanliness is critical, such as when handling foodstuffs, medicinal preparations or electronic components that may be easily contaminated or damaged by errant dust, dirt, debris, etc. Such sanitary environments often have within the confines of the sanitary area, piping and conduits for delivering materials to workstations or other assembly type areas. By preventing areas in which errant dust, dirt, debris, etc. can accumulate, the possibility that the manufactured goods may become contaminated will be minimized.

The ability to maintain a sanitary environment can be critical to maintaining successful manufacturing and handling operations. Thus, there is a need for conduit supports and methods to position a pipe or other conduit in a desired orientation while preventing the accumulation of errant dust, dirt, debris, etc. Further, a need also exists for a conduit support that can be conveniently cleaned and made suitable for a new process requiring complete elimination of errant matter. As well, a conduit support for use with a new method of insulation is desirable, which is made possible with the present invention. These are just some of the needs addressed by various embodiments of the subject invention.

SUMMARY OF THE INVENTION

In accordance with one embodiment of the present invention, there is provided a conduit support. In one embodiment, the conduit support may include a first member having a first conduit-receiving area therein. In addition, the conduit support may include a second member releasably coupled to the first member and having a substantially uninterrupted convex shaped upper surface. The second member may have a second conduit-receiving area that cooperates with the first conduit-receiving area to establish a conduit area in the conduit support when the first and second members are coupled to each other. The first member may be sized and shaped relative to the second member such that no portion of the first member protrudes laterally beyond the upper surface of the second member when the first and second members are coupled together. At least one fastener may be employed to couple the first and second members together. The fasteners may be dimensioned so that no portion of a fastener protrudes laterally beyond the upper surface of the conduit support to avoid the formation of surfaces which may accumulate dust or debris. The first and second members may be configured to engage the conduit in a sealing arrangement either alone or with the implementation of a grommet or seal in a conduit area of the conduit support. A support member may be attached to a portion of the conduit support for attaching the conduit support to a support structure (i.e., beam, rafter, ceiling, wall, etc.).

Another embodiment of the present invention may generally have the same construction as the first embodiment described above, except that in this embodiment, the first and second members may be coupled together by a hinge such that one portion can pivot to an open position relative to another portion. In this embodiment, only one fastener may be necessary to secure the first and second members together.

Another embodiment of the present invention may comprise an apparatus for supporting a plurality of conduits in a stacked orientation. The apparatus may include a plurality of conduit supports that may be coupled together by interconnecting threaded rods or the like, although other means of securing them together are possible. These interconnections between the conduit supports may engage one another in a sealing arrangement to further certain objectives of the present invention. The stacked arrangement of conduit supports may employ a support member to secure the conduit supports to a supporting structure.

A further embodiment of the present invention comprises a conduit support that may be secured to a support structure by a telescoping support member. The conduit support may be secured to the telescoping support member in a variety of manners. One such manner may be with a fastener positioned through the conduit support into the telescoping member, while another manner may contemplate a threaded engagement between the conduit support and the telescoping support member.

Another embodiment of the present invention may comprise an apparatus for supporting conduits relative to a support structure and may include an elongated support member which is attached to the support structure. The apparatus may further include a first conduit support coupled to the elongated support member and a second conduit support coupled to the first conduit support. The first and second conduit supports may be configured so as to avoid surfaces that might collect dust or debris.

Another embodiment of the present invention may comprise an apparatus for supporting a plurality of conduits in a linear orientation. The apparatus may include a plurality of conduit supports that are coupled to a common elongated support member by interconnecting threaded rods, although other means of securing them to the elongated support member are possible. These interconnections between the conduit supports and the elongated support member may be established such that a seal is created therebetween.

Another embodiment of the present invention may include a method of supporting one or more conduit in a sanitary environment. The method may include suspending a conduit support of the present invention from a support structure such that there are substantially no surfaces and/or recesses wherein contaminants may be able to accumulate due to gravity, and supporting a portion of conduit therein.

Another embodiment of the present invention may include a method of insulating one or more conduit supports that are supporting pipes in a sanitary environment. The method may include affixing a support member to the conduit support of the present invention and suspending the support member from a support structure such that no surfaces and/or recesses are created wherein contaminants may be able to accumulate due to gravity or otherwise be able to infiltrate between members of the conduit support. The method may further include surrounding the entire conduit support and the conduit with insulation such that the insulation is separated about a single seam located generally about the outer circumference of the conduit support.

Accordingly, the present invention provides solutions to the shortcomings of prior devices and methods for supporting conduits. Those of ordinary skill in the art will readily appreciate, however, that these and other details, features and advantages will become further apparent as the following detailed description of the embodiments proceeds.

BRIEF DESCRIPTION OF THE DRAWINGS

In the accompanying Figures, there are shown present embodiments of the invention wherein like reference numerals are employed to designate like parts and wherein:

FIG. 1 is a perspective view of one embodiment of a conduit support of the present invention supporting a conventional conduit, which is shown in shadow lines;

FIG. 2 is a side view of the conduit support of FIG. 1;

FIG. 2A is an enlarged view of a portion of a fastener arrangement employed in the embodiment of FIG. 2;

FIG. 3 is a cross-sectional view of the conduit support depicted in FIG. 2 taken along line 3-3 in FIG. 2;

FIG. 3A is an enlarged view of a portion of the embodiment illustrated in FIG. 3;

FIG. 4 is a side view of another embodiment of a conduit support of the present invention;

FIG. 5 is a partial cross-sectional view of the conduit support depicted in FIG. 4 taken along line 5-5 in FIG. 4;

FIG. 6 is a side view of another embodiment of a conduit support of the present invention;

FIG. 7 is a partial cross-sectional view of the conduit support depicted in FIG. 6 taken along line 7-7 in FIG. 6;

FIGS. 8 and 8A are perspective views of other conduit support embodiments of the present invention which may be used to support a plurality of conduits in stacked orientations;

FIG. 9 is a side view of the conduit support of FIG. 8;

FIG. 10 is a cross-sectional view of the conduit support depicted in FIG. 9 taken along line 10-10 in FIG. 9;

FIG. 24 is a perspective view of another embodiment of the conduit support of the present invention supporting a conventional conduit, which is shown in shadow lines;

FIG. 25 is a side view of the conduit support of FIG. 24;

FIG. 25A is an enlarged view of a portion of a fastener arrangement employed in the embodiment of FIG. 25;

FIG. 26 is a cross-sectional view of the conduit support depicted in FIG. 25 taken along line 26-26 in FIG. 25;

FIG. 26A is an enlarged view of a portion of the embodiment illustrated in FIG. 26.

DETAILED DESCRIPTION OF THE EMBODIMENTS OF THE INVENTION

Figure 8A:
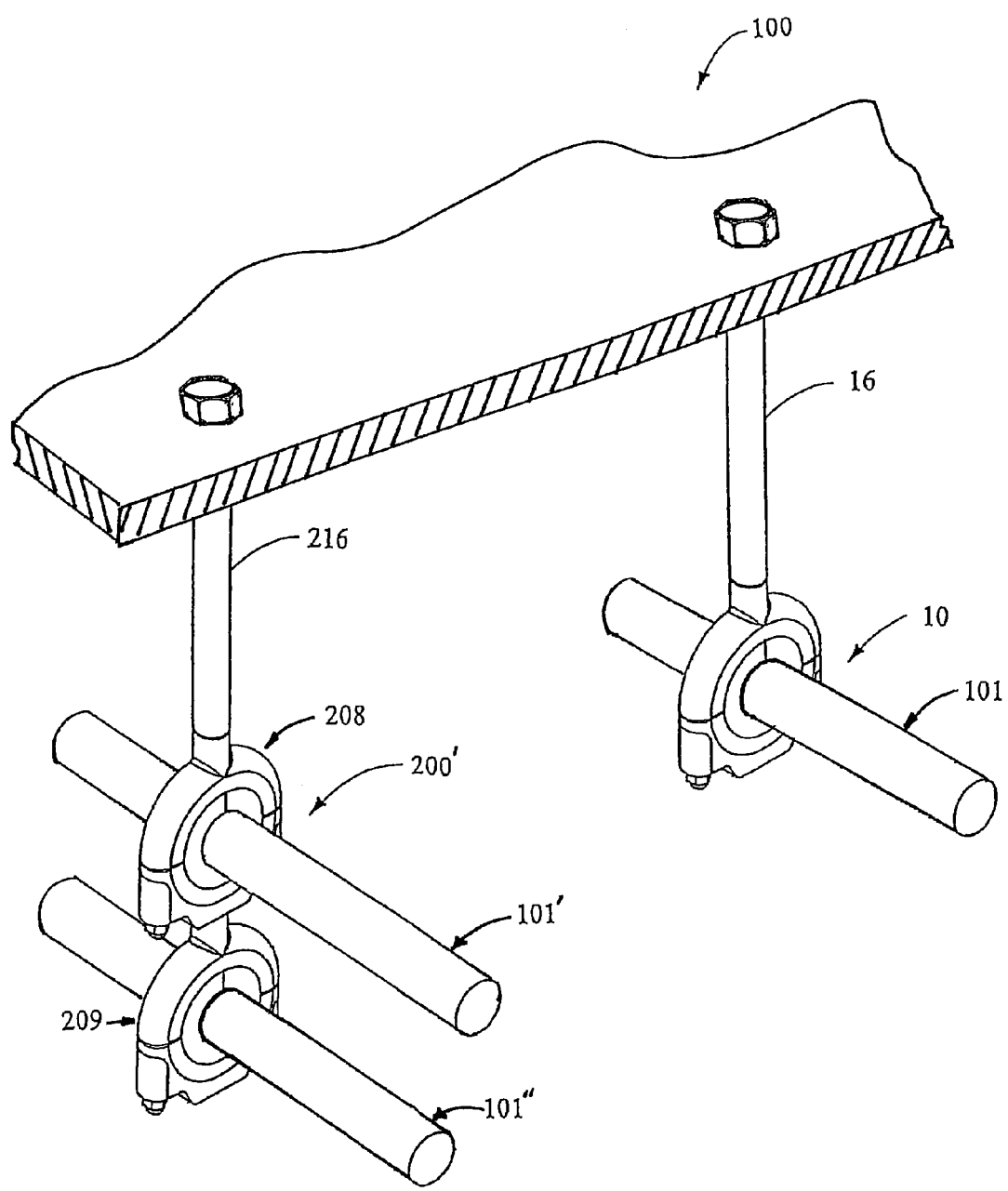

Referring now to the drawings for the purposes of illustrating embodiments of the invention only and not for the purposes of limiting the same, FIGS. 1-3A illustrate one embodiment of the present invention which comprises a conduit support 10 for supporting a conduit 101 relative to a support structure 100. In one embodiment, conduit support 10 may include a lower or "first" member 12 that has a "first" conduit-receiving area 13 formed therein and an upper or second member 14 that has a second conduit-receiving area 15 formed therein. The conduit support 10 may be secured to support structures 100, such as a ceiling, joists, rafters, etc. by a vertically extending support member 16 that may in turn be coupled to the second member 14 by way of threads on a threaded end 36 or other suitable fastening arrangements such as, for example, weldments. Support member 16 may be constructed in a variety of manners, shapes and configurations as dictated by the surrounding environment.

The second member 14 may be removably attached to the first member 12 by, for example, one or more threaded fasteners 22. In one embodiment, fasteners 22 may extend through bores 20 in the first member 12 to engage threaded holes 21 in first member 12. In one embodiment, threaded fasteners 22 may have "acorn" heads to avoid the formation of laterally extending surfaces that may trap or accumulate dust and debris or otherwise complicate cleaning of the conduit support 10 when it is oriented as shown in FIG. 3. A gasket 17 may be provided between the first member 12 and the second member 14 to prevent accumulation or infiltration of dirt, debris, cleaning fluids, etc. in bores 22, which may provide a substantially uninterrupted surface between the first member 12 and the second member 14. Gasket 17 may be fabricated from rubber, Silicone, Nitrile, Buna N, or other suitable material that may be particularly compatible with the characteristics of the fluid passing through the conduit 101, such as the temperature of the fluid, and/or the sanitary environment in which the conduit support 10 is used. Gasket 17 may also serve to create a seal between the first member 12 and the second member 14 to avoid the formation of recesses, small pockets, gaps, etc. between these members which could accumulate dust, debris, cleaning fluids, etc., allowing the surfaces of first member 12 and second member 14 to abut one another in a substantially uninterrupted fashion. Further, a conventional silicone sealing compound, or the like, may be used to further assist in sealing the first member 12 and the second member 14 in combination with gasket 17. In other embodiments, gasket 17 may be omitted and sealant employed to achieve a seal between the first member 12 and the second member 14.

In one embodiment, the first member 12 may be shaped and sized relative to the second member 14 such that when attached to the second member 14, no portion of the first member 12 forms a surface or area which could permit the accumulation of dirt, debris, cleaning fluids, etc. thereon, otherwise forming a substantially uninterrupted surface, when the conduit support 10 is oriented as shown in FIGS. 1-3A. In particular, arrow "G" illustrates the force of gravity. Also, as can be seen in FIGS. 2 and 3, no portion of the first member 12 protrudes laterally outwardly along plane A-A beyond the second member 14. In addition, fasteners 22 may be sized such that no portion of the fasteners 22 extends laterally outwardly along plane H-H beyond the first member 12. Fastener gaskets 26, which also may be fabricated from the material comprising gasket 17 or other suitable material, may be utilized between fasteners 22 and first member 12 to establish an uninterrupted surface and a seal between the fastener 22 and the first member 12, thus preventing the inadvertent infiltration or accumulation of dirt or debris in bores 22. In addition, washers 24 can be utilized for providing a bearing surface between the heads of fasteners 22 and the fastener gaskets 26. It will be appreciated that when employed, fasteners 22 and fastener gaskets 26 also do not outwardly protrude beyond first member 12. Further, a silicone sealing compound, or a similar substance, could be implemented either in combination with the washers 24 and fastener gaskets 26 or may be used as an alternative to achieve a seal between the heads of fasteners 22 and the first member 12.

In one embodiment, the upper surface of second member 14 may be generally convex and smooth in texture, generally anywhere from about a 100 RA finish to about a 5 RA finish, and may be fabricated from, for example, steel, stainless steel, plastics, polymers, rubber, etc. The smooth finish on the upper surface avoids the existence of recesses, crevasses and other areas that may encourage the accumulation of dust, dirt, debris, cleaning fluids, etc. The smoother the finish, i.e. 5 RA, the fewer places on the upper surface of the second member 14 that such contaminants may accumulate. This smooth texture may also be accomplished by utilizing coatings on the surfaces such as, for example, chrome plating, plastics, etc. This configuration defines a substantially uninterrupted curved convex outer surface having virtually no horizontally extending portion which could permit the accumulation of dust, dirt, debris, etc. due to gravity when the second member 14 is coupled to the first member 12 and oriented, for example, as shown in FIG. 2. More specifically, the upper surface may be arcuately shaped as shown in FIGS. 1 and 2. This shape provides a curved surface about a central axis J-J that extends through a center point 103 (FIG. 2) and a radial axis K-K that extends radially about center point 103. The upper arcuate surface of second member 14 may generally abut the rounded outer surfaces of first member 12 when supporting a conduit 101. See FIG. 1. As can also be seen in the Figures, the upper surface of second member 14 may face opposite to the direction of the influence of gravity (represented by the arrow "G" in FIG. 3). Thus, when errant particles or debris fall toward the ground, the upper convex surface due to its shape and texture does not afford a surface upon which dirt, debris, etc. may accumulate.

In one embodiment, an apex area 30 may protrude from the upper surface of the second member 14. The apex area 30 may define an installation axis B-B that extends through center point 103 and may be substantially perpendicular to plane A-A as shown in FIG. 3. As indicated above, the support member 16 may be threadably secured to the second member 14 by screwing a threaded end 36 of the support member 16 into a threaded bore 33 provided in the apex area 30. (See FIG. 3A). In one embodiment, a gasket 28 may be provided between the support member 16 and apex area 30 of the second member 14. Gasket 28 may be fabricated from the material forming gasket 17, or other suitable material such as, for example, elastomers. As can be seen in FIG. 3, the upper portion 27 of the support member 16 may be configured for attachment to a support structure 100. In one embodiment, the upper portion 27 of the support member 16 may be provided with a threaded bore 23 for receiving a threaded fastener 25 therein. However, the support member 16 may be attached to a support structure 100 through other suitable fastener arrangements such as, for example by welding, gluing, all-thread in combination with a nut, etc.

The conduit 101, shown in shadow in FIG. 1, may be sealingly supported by the conduit support 10 in the conduit area as illustrated. As can be seen in FIG. 3, a grommet 18 may be cradled within the conduit area, formed by corresponding conduit-receiving areas 13, 15 in the first member 12 and the second member 14, respectively, to establish a seal between the conduit 101 and the support 10. A seal may be desirable in applications wherein the conduit support 10 acts more like a clamp for rigid support of a conduit 101. In one embodiment, the grommet 18 may be fabricated from resilient material such as, for example, rubber, Silicone, Nitrile, Buna N, or the like and have a slit 19 therein to facilitate easy installation of the grommet 18 over the conduit 101 as shown. It will also be appreciated that grommet 18 could be fabricated without the slit 19 and slid over an end of the conduit 101 prior to installation of conduit 101. The grommet 18 may be further sealed with Silicone sealing compounds or the like.

However, some applications require that the conduit 101 be capable of lateral movement wherein the conduit 101 is permitted some movement within the conduit support 10 while being supported and wherein the conduit support 10 acts more like a hanger. In these embodiments, the grommet 18 may be fabricated from more rigid material such as, for example, polymeric material (e.g. polyetherimide), Ultem or the like. Such applications may further require some radial clearance between the grommet 18 and the conduit to allow for expansion and movement of the conduit 101 supported due to heat expansion or other causes. See FIG. 1. In addition, the grommet 18 may be fabricated in multiple pieces and may be fabricated in a desired color, for example blue, designated as 109 in FIG. 1 to assist in identifying properties of the conduit 101 or the type of matter being transported by the conduit 101.

Although not required, using a grommet 18 may be beneficial as the fluid carried in the conduit 101 may cause the conduit 101 to change temperatures relative to the conduit support 10. Therefore, utilizing a grommet 18 may prevent condensation due to, for example, direct metal-to-metal contact of the conduit 101 and the conduit support 10 wherein there are temperature differences between the conduit 101 and the conduit support 10.

The implementation of grommet 18 may additionally allow for differing sizes of conduit 101 to be supported with the use of a thicker or thinner grommet 18. Thus, the conduit support 10 may be able to support a wide variety of differently sized conduits 101 as the grommet 18 may be thicker or thinner to accommodate the size of the conduit 101 to be supported.

To install the conduit 101 within the support 10, the lower or first member 12 may be detached from the upper or second member 14 by removing fasteners 22. The grommet 18 may then be installed around a portion of the conduit 101 (if the grommet 18 is one piece), or the portions of the grommet 18 may be cradled in the conduit-receiving areas 13, 15 if the grommet 18 is of multiple-piece construction. The grommet 18 and conduit 101 may be supported within the conduit area of the conduit-receiving areas 13, 15 when the fasteners 22 are reinstalled to clamp the grommet 18 and conduit 101 between the first member 12 and the second member 14 as illustrated in FIG. 1.

Another conduit support 110 of the present invention is illustrated in FIGS. 4-5, which may utilize a single fastener 122 and a hinge 129. Hinge 129 may comprise a pin, about which the second member 114 may pivot relative to the first member 112. Arrow "L" in FIGS. 5 and 7 illustrate the manner in which the first member 112 may pivot relative to the second member 114. The apex area 130 may define an installation axis B'-B' as shown in FIG. 5. The support member 116 may be threadably secured to the second member 114 by screwing a threaded end 136 of the support member 116 into a threaded bore 133 provided in the apex area 130. However, other fastener arrangements could be employed as discussed herein. Further, other variations of the hinge 129 may be implemented while remaining within the spirit and scope of the present invention. Support member 116 may also be constructed in a variety of other manners and configurations such as, for example, those illustrated in FIGS. 24-26A.

In this embodiment, the first member 112 may be so configured such that it does not protrude laterally beyond the outer surfaces of second member 114 and such that no portion of the first member 112 forms surfaces which could accumulate errant dust, dirt, debris, etc. when the conduit support 110 is oriented as shown in FIGS. 4 and 5. That is, no portion of the first member 112 protrudes outwardly along a plane of joinder A'-A' beyond the second member 114 such that an uninterrupted surface is formed between the first member 112 and the second member 114.

In one embodiment, the upper surface of second member 114 may be generally convex and smooth in texture, generally anywhere from about a 100 RA finish to about a 5 RA finish, and may be fabricated from, for example, steel, stainless steel, plastics, polymers, rubber, etc. The smooth finish on the upper surface avoids the existence of recesses, crevasses and other areas that may encourage the accumulation of dust, dirt, debris, cleaning fluids, etc. The smoother the finish, i.e. 5 RA, the fewer places on the upper surface of the second member 114 that such contaminants may accumulate. This smooth texture may also be accomplished by utilizing coatings on the surfaces such as, for example, chrome plating, plastics, etc. This configuration defines a substantially uninterrupted curved convex surface having virtually no horizontally extending surfaces which could permit the accumulation of dust, dirt, debris, etc. due to gravity (arrow "G") when oriented as shown in FIG. 5. More specifically, the upper surface may be arcuately shaped as shown in the FIGS. 4 and 5. This shape provides a curved surface about a central axis J'-J' that extends through a center point 103' and a radial axis K'-K' that extends radially about center point 103'. The upper arcuate surface of second member 114 may generally abut the rounded portion of first member 112 when supporting a conduit. As can be seen in the Figures, the upper surface of second member 114 may face opposite to the direction of the pull of gravity (represented by the arrow "G" in FIG. 5) and may have an apex area 130 protruding therefrom. Thus, when errant particles or debris fall toward the ground, the upper convex surface due to its shape and texture does not afford a surface upon which dirt, debris, etc. may accumulate.

FIGS. 6 and 7 show another embodiment of the present invention having a snap fastener 171 of the conduit support 170, rather than a fastener 122 of conduit support 110. The snap fastener 171 is shown in FIG. 7 having a latch on the first member 112 that engages a recess on second member 114. The remaining structure of conduit support 170 is much the same as illustrated in FIGS. 4-5, which are described above. Although the snap fastener 171 is illustrated having a single self-locking snap fastener 171, other embodiments may be implemented while remaining within the spirit and scope of the present invention.

FIGS. 8-10 and 8A illustrate a modular conduit support assembly Embodiments 200 and 200' of the present invention. FIGS. 8-10 illustrate three conduit supports 208, 209 and 210 that are positioned in a stacked configuration, although two or more modular conduit supports may be used in this manner as illustrated in FIG. 8A. FIG 8A illustrates use of a first modular conduit support 208 that is suspended from a structure 100 by a support member 216 in the above-described manner. A second modular conduit support 209 may be attached to the first modular conduit support 208. As can be seen in FIG. 8, a third conduit support 210 may be attached to the second conduit support 209 and so on. The third conduit support 210 may have a first member 212 and a second member 214 much like the previously described embodiments. However, the first modular conduit support 208 may be equipped with a third member 234, similar in structure and function with first member 212 in relation to supporting a conduit 101. Third member 234 may, however, additionally have a threaded bore 240 to attach to another modular conduit support 209 or third conduit support 210 by way of an interconnection member 290 such as a threaded rod or the like, or other suitable fastening arrangement such as, for example, welding, gluing, etc. The interconnection member 290 connects apex area 230 of third conduit support 210 to the third member 234 of another modular conduit support 209. Likewise, another interconnection member 290 connects apex area 230 of another modular conduit support 209 to the third member 234 of first modular conduit support 208. The threaded bore 240 of another modular conduit support 209 may define an installation axis B"-B" as shown in FIG. 10. In one embodiment, gasket 228 may be provided between the third members 234 and the second members 214 as shown in FIG. 10. When the modular arrangement is provided, several conduits 101 (not shown) may be supported simultaneously and may additionally be supported in varying substantially parallel directions. Thus, depending upon their orientations, conduits 101 (not shown) can be supported such that they may be on planes parallel to each other but also be oriented at angles relative to each other. As can also be see, the modular conduit arrangement 200' depicted in FIG. 8A may be used in connection with another conduit support 10 that is also suspended from the support structure 100 and which supports a conduit 101. The first modular conduit support 208 may support another conduit 101' and the second modular conduit support 209 May support a third conduit 101' therein.

In this embodiment, much like the first embodiment disclosed, the first member 212 may be so configured such that it does not protrude laterally beyond the outer surfaces of second member 214 of the third conduit support 210 when it is attached thereto. Likewise, third member 234 of another modular conduit support 209 may not protrude laterally beyond the outer surfaces of the second member 214 thereof. Similarly, the third member 234 of the first modular conduit support 208 may not protrude laterally beyond the second member 214 thereof. Thus, such arrangements prevent the accumulation of errant dust, dirt, debris, etc. between the various components of the conduit supports 208, 209, 210 when the conduit support 200 assembly is oriented as shown in FIGS. 8-10, having a substantially uninterrupted surface.

In one embodiment, the upper surface of second member 214 may be generally convex and smooth in texture, generally anywhere from about a 100 RA finish to about a 5 RA finish, and may be fabricated from, for example, steel, stainless steel, plastics, polymers, rubber, etc. The smooth finish on the upper surface prevents recesses, crevasses and other areas that may encourage the accumulation of dust, dirt, debris, cleaning fluid, etc. The smoother the finish, i.e. 5 RA, the fewer places on the upper surface of the second member 214 that such contaminants may accumulate. This smooth texture may also be accomplished by utilizing coatings on the surfaces such as, for example, chrome plating, plastics, etc. This configuration defines a substantially uninterrupted curved convex surface having virtually no horizontal surface whereupon dust, dirt, debris, etc. may accumulate due to gravity. More specifically, the upper surface may be arcuately shaped. This shape provides a curved surface about a central axis J"-J" that extends through a center point 203 and a radial axis K"-K" that extends radially about center point 203. The upper arcuate surface of second member 214 may generally abut the rounded portion of first member 212 when supporting a conduit. As can be seen in the drawings, the upper surface of second member 214 may face opposite to the direction of the pull of gravity (represented by the arrow "G" in FIG. 10) and may have an apex area 230 protruding therefrom. Thus, when errant particles or debris under the influence of gravity fall toward the ground, the upper convex surface due to its shape and texture does not afford a surface upon which dirt, debris, etc. may accumulate.

Figure 11:
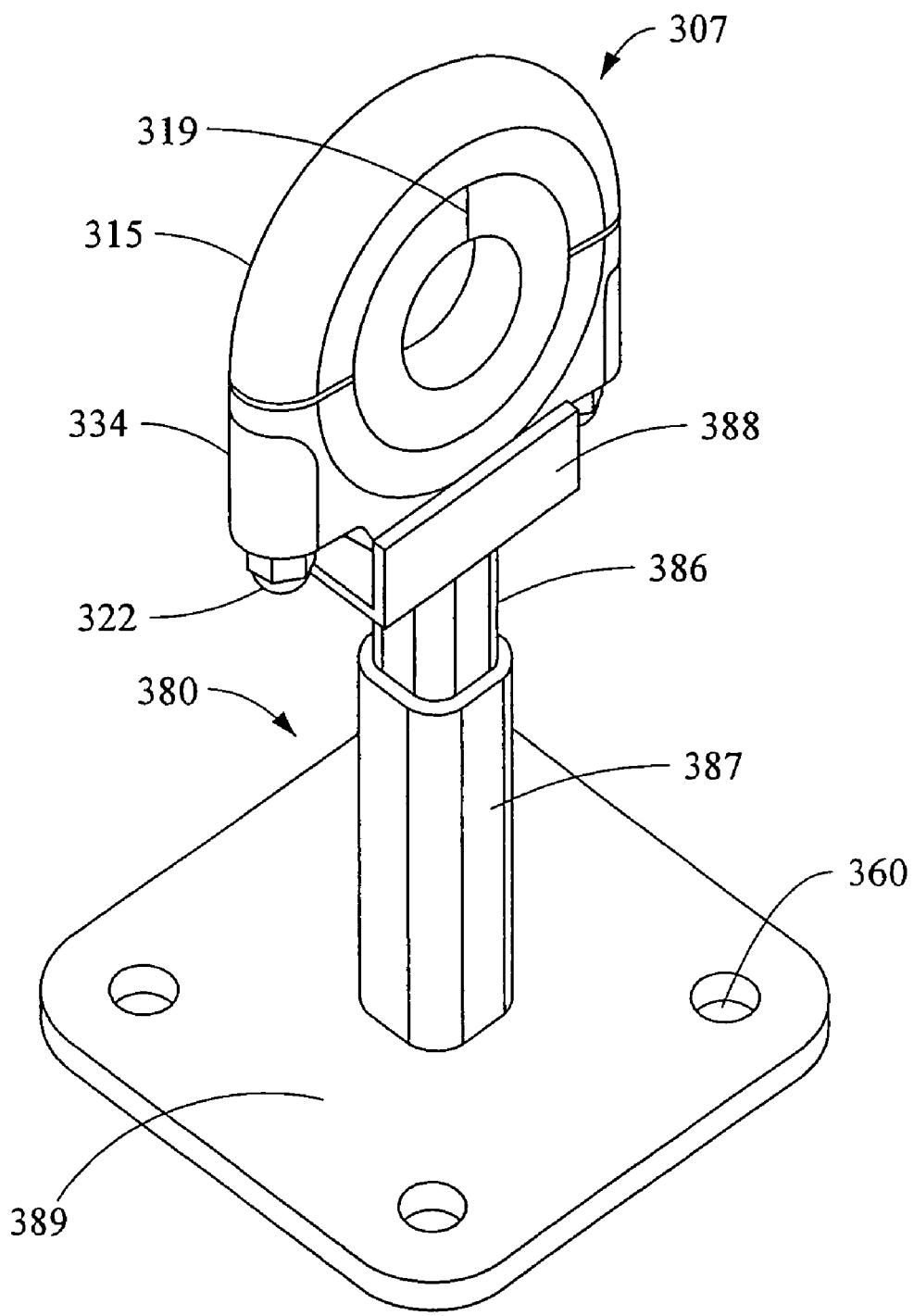
FIG. 11 is a perspective view of another embodiment of a conduit support of the present invention.
Figure 13:
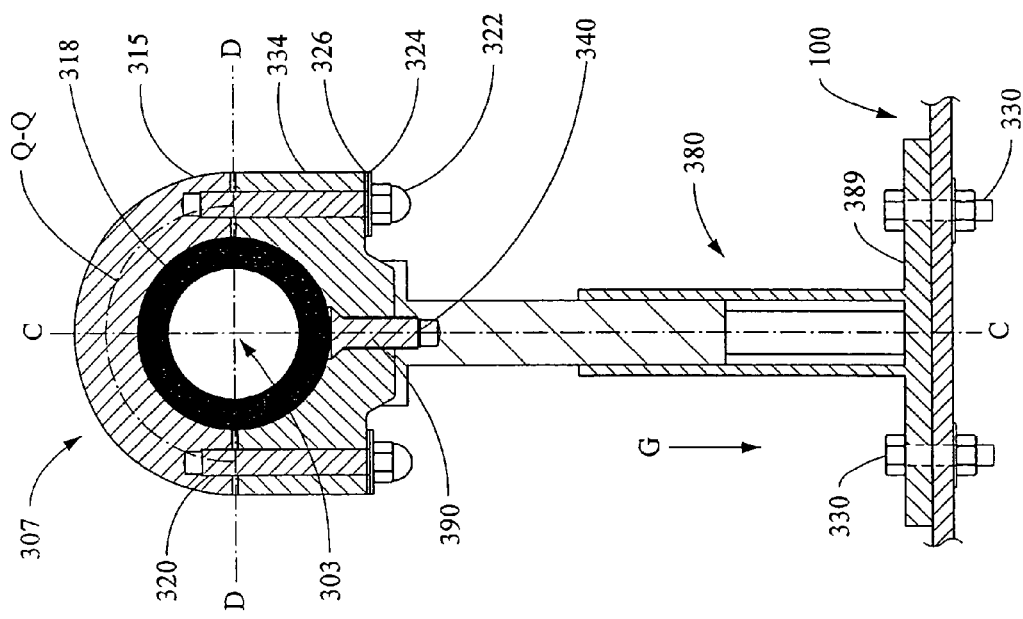
FIG. 13 is a cross-sectional view of the conduit support depicted in FIG. 12 taken along line 13-13 in FIG. 12.
Figure 12:
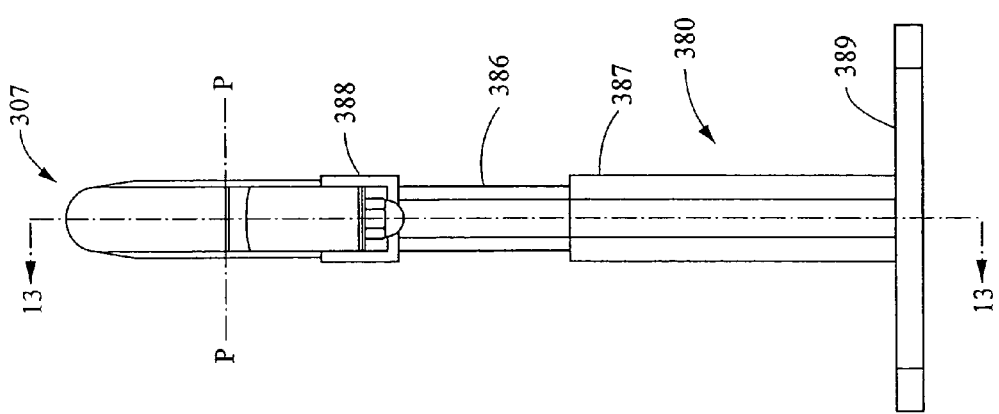
FIG. 12 is a side view of the conduit support of FIG. 11.

FIGS. 11-13 depict a modular conduit support 307 of the present invention, which may be telescopingly mounted to a telescoping support 380. The modular conduit support 307 may include a third member 334 and an upper member 315. The upper member 315 may be releasably connected to the third member 334 by fasteners 322. In one embodiment, fasteners 322 may have "acorn" heads to minimize any flat surfaces that may trap or accumulate dust and debris. The modular conduit support 307 may be secured to support structures 100, such as a floor, joists, rafters, etc.

In this embodiment, the third member 334 may be so shaped and configured so as to not protrude laterally beyond the outer surfaces of upper member 315 along a plane D-D when it is attached thereto. Such arrangement prevents the formation of surfaces which might accumulate errant dust, dirt, debris, etc. when the modular conduit support 307 is oriented as shown in FIGS. 11-13. Thus the surface of the modular conduit support 307 is substantially uninterrupted by recesses or other depressions.

Also in this embodiment, telescoping support 380 may comprise a first support member 386, second support member 387, a support channel 388 and a base member 389. In one embodiment, modular conduit support 307 may be supported by support channel 388 such that rotation of the modular conduit support 307 is prevented. As can be seen in the Figures, support channel 388 may overlap and abut a portion of third member 334 such that when third member 334 is coupled to first support member 386, support channel 388 may prevent rotation of third member 334. A threaded bore 340 may be provided in modular conduit support 307 and may define an installation axis C-C as shown in FIG. 13. The third member 334 of the modular conduit support 307 may be threadably secured to the first telescoping member 386 by a threaded screw 390 to secure it to the telescoping support 380. However, other fastener arrangements could be employed such as a fixed or welded connection between third member 334 and first telescoping member 386. FIG. 13 further illustrates how first support member 386 may be coupled together with second support member 387 in a telescoping fashion such that first support member 386 can be adjusted vertically with respect to second support member 387 and retained in such position by set screws (not shown) or other retaining arrangements. Base member 389 may be secured to support structures 100, such as a floor, joists, walls or rafters, by appropriate fastening arrangements such as by fasteners 330 extending through holes 360 in the base member 389 or by other suitable means such as, for example, welding, gluing, clamping, etc. Telescoping support 380 could also be constructed with tubular members to allow for rotation of modular conduit support 307 relative to the telescoping support 380.

In one embodiment, the upper surface of second member 315 may be generally convex and smooth in texture, generally anywhere from about a 100 RA finish to about a 5 RA finish, and may be fabricated from, for example, steel, stainless steel, plastics, polymers, rubber, etc. The smooth finish on the upper surface prevents recesses, crevasses and other areas that may encourage the accumulation of dust, dirt, debris, etc. The smoother the finish, i.e. 5 RA, the fewer places on the upper surface of the second member 315 that such contaminants may accumulate. This smooth texture may also be accomplished by utilizing coatings on the surfaces such as, for example, chrome plating, plastics, etc. This configuration defines a substantially uninterrupted curved convex surface having virtually no horizontally extending surfaces which could permit the accumulation of dust, dirt, debris, etc. due to gravity. More specifically, the upper surface may be arcuately shaped as shown in the FIGS. 11-13. This shape provides a curved surface about a central axis P-P that extends through a center point 303 and a radial axis Q-Q that extends radially about center point 303. The upper arcuate surface of second member 315 may generally abut the rounded portion of third member 334 when supporting conduit. As can also be seen in the Figures, the upper surface of second member 315 may face opposite to the direction of the pull of gravity (represented by the arrow "G" in FIG. 13). Thus, when errant particles or debris under the influence of gravity fall toward the ground, the upper convex surface does not afford a surface upon which dirt, debris, etc. may accumulate.

Figure 14:
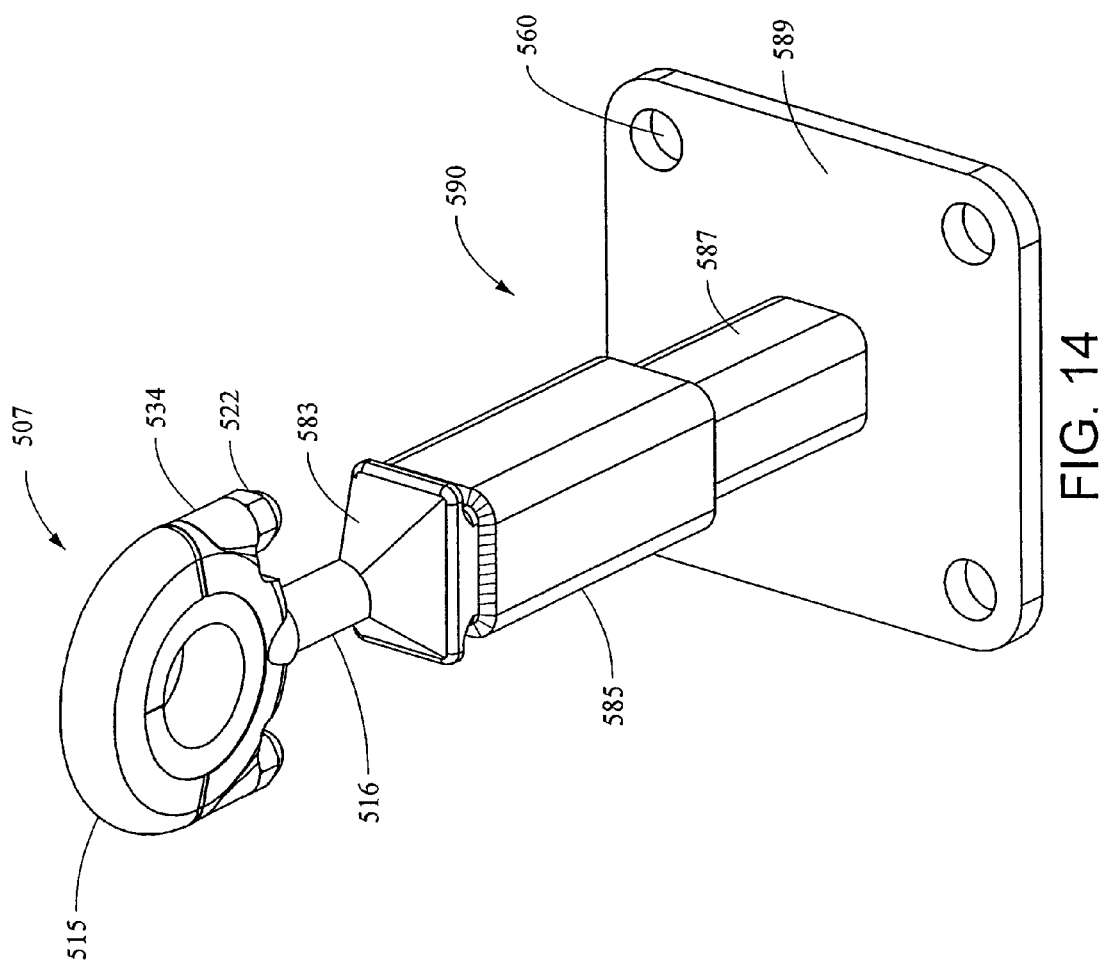
FIG. 14 is a perspective view of another embodiment of a conduit support of the present invention.
Figure 16:
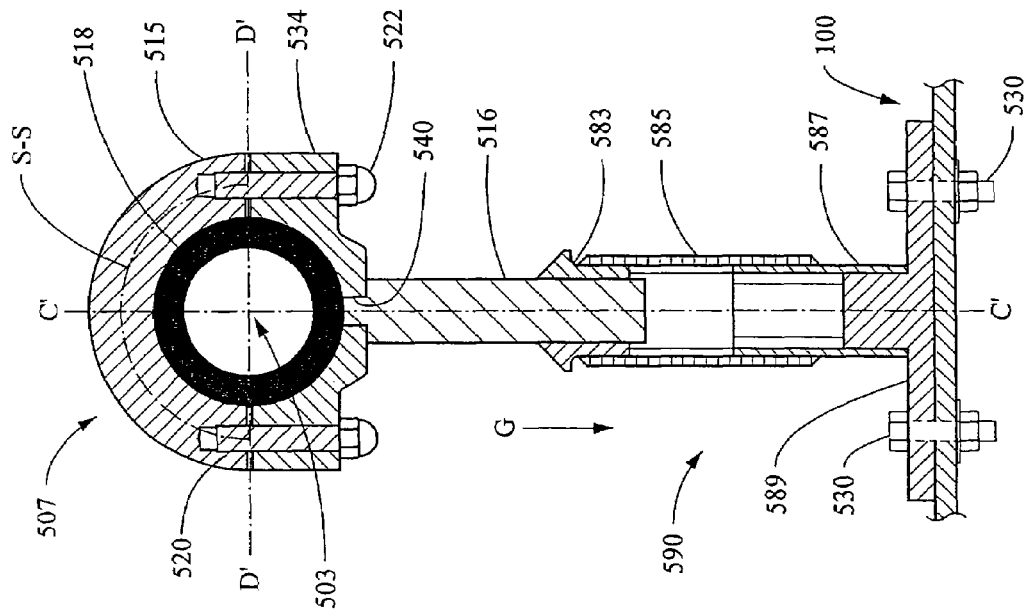
FIG. 16 is a cross-sectional view of the conduit support depicted in FIG. 15 taken along line 16-16 in FIG. 15.
Figure 15:
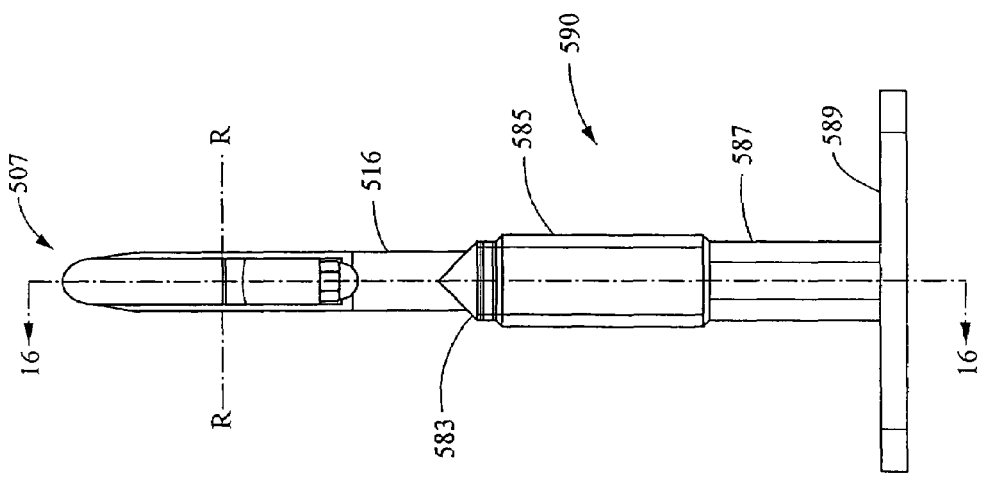
FIG. 15 is a side view of the conduit support of FIG. 14.

FIGS. 14-16 illustrate another embodiment of a modular conduit support 507, which may be mounted to a telescoping support 590. The modular conduit support 507 may include a third member 534 and an upper member 515. The upper member 515 may be releasably connected to the third member 534 by fasteners 522, or other fastening arrangements discussed herein. In one embodiment, fasteners 522 may have "acorn" heads to minimize any flat surfaces that may trap or accumulate dust and debris. The modular conduit support 507 may be secured to support structures 100, such as a floor, joists, rafters, etc.

In this embodiment, the third member 534 may be so shaped and configured so as to not protrude laterally beyond the outer surfaces of upper member 515 along a plane D'-D' when it is attached thereto. Such arrangement allows for an uninterrupted surface that prevents formation of recesses or surfaces that might accumulate errant dust, dirt, debris, etc. when the modular conduit support 507 is oriented as shown in FIGS. 14-16. Thus the surface of the modular conduit support 507 is substantially uninterrupted by recesses.

This embodiment also has a telescoping support 590 that may comprise a first support member 516, second support member 587, a sleeve support member 585, a cap member 583 and a base member 589. In one embodiment, modular conduit support 507 may be supported by a threaded engagement with first support member 516. As can be seen in the Figures, first support member 516 is affixed to cap member 583 that overlaps a portion of first support member 516 such that an uninterrupted surface is formed to prevent the accumulation of errant dust, dirt, debris, etc. Cap member 583 is thus fitted inside for telescoping engagement with sleeve support member 585 such that the surfaces that abut are substantially uninterrupted. Sleeve support member 585 is then positioned about the outer edges of second support member 587 in a telescoping fashion. Each of the connections between the telescoping members 583, 585, 587 may be secured together by set screws, clamps, etc. (not shown) for easy adjustment. Once the telescoping support 590 is adjusted vertically into a desired position, set screws, clamps, etc. (not shown) could hold the telescoping members 583, 585, 587 in place while a more permanent means for attaching them may be implemented such as, for example, bolting, welding, gluing, etc.

A threaded bore 540 may be provided in modular conduit support 507 and may define an installation axis C'-C' as shown in FIG. 16. The third member 534 of the modular conduit support 507 may be threadably secured to the first support member 516, which is connected to the telescoping support 590. However, other fastener arrangements could be employed such as a fixed or welded connection between third member 534 and first support member 516.

Base member 589 may be secured to support structures 100, such as a floor, joists, walls or rafters, by appropriate fastening arrangements such as by fasteners 530 extending through holes 560 in the base member 589 or by other suitable means such as, for example, welding, gluing, clamping, etc. Telescoping support 590 could also be constructed with tubular members to allow for rotation of modular conduit support 507 relative to the telescoping support 590.

In one embodiment, the upper surface of second member 515 may be generally convex and smooth in texture, generally anywhere from about a 100 RA finish to about a 5 RA finish, and may be fabricated from, for example, steel, stainless steel, plastics, polymers, rubber, etc. The smooth finish on the upper surface prevents recesses, crevasses and other areas that may encourage the accumulation of dust, dirt, debris, cleaning fluid, etc. The smoother the finish, i.e. 5 RA, the fewer places on the upper surface of the second member 515 that such contaminants may accumulate. This smooth texture may also be accomplished by utilizing coatings on the surfaces such as, for example, chrome plating, plastics, etc. This configuration defines a substantially uninterrupted curved convex surface having virtually no horizontally extending surfaces which could permit the accumulation of dust, dirt, debris, etc. due to gravity. More specifically, the upper surface may be arcuately shaped as shown in the Figures. This shape provides a central axis R-R that extends through a center point 503 and a radial axis S-S that extends radially about center point 503. The upper arcuate surface of second member 515 may generally abut the rounded outer surfaces of third member 534 when supporting conduit. As can also be seen in the Figures, the upper surface of second member 515 may face opposite to the direction of the pull of gravity (represented by the arrow "G" in FIG. 16). Thus, when errant particles or debris under the influence of gravity fall toward the ground, the upper convex surface due to its shape and texture does not afford a surface upon which dirt, debris, etc. may accumulate.

Figure 18:
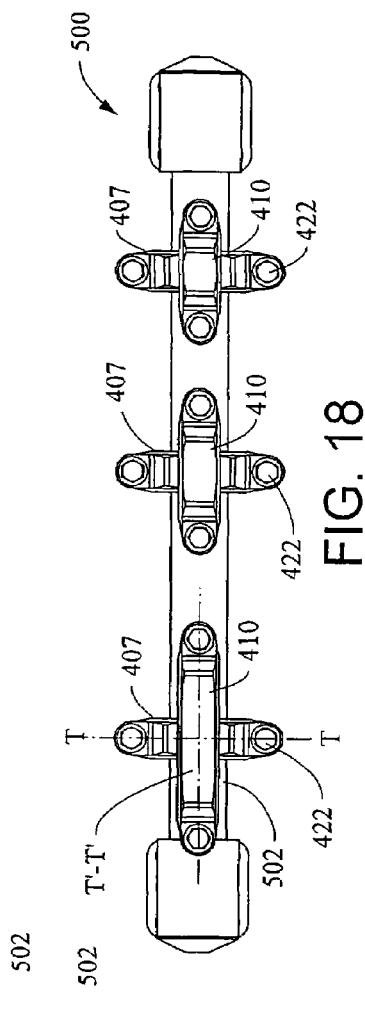
FIG. 18 is a bottom view of the conduit support depicted in FIG. 17.
Figure 17:
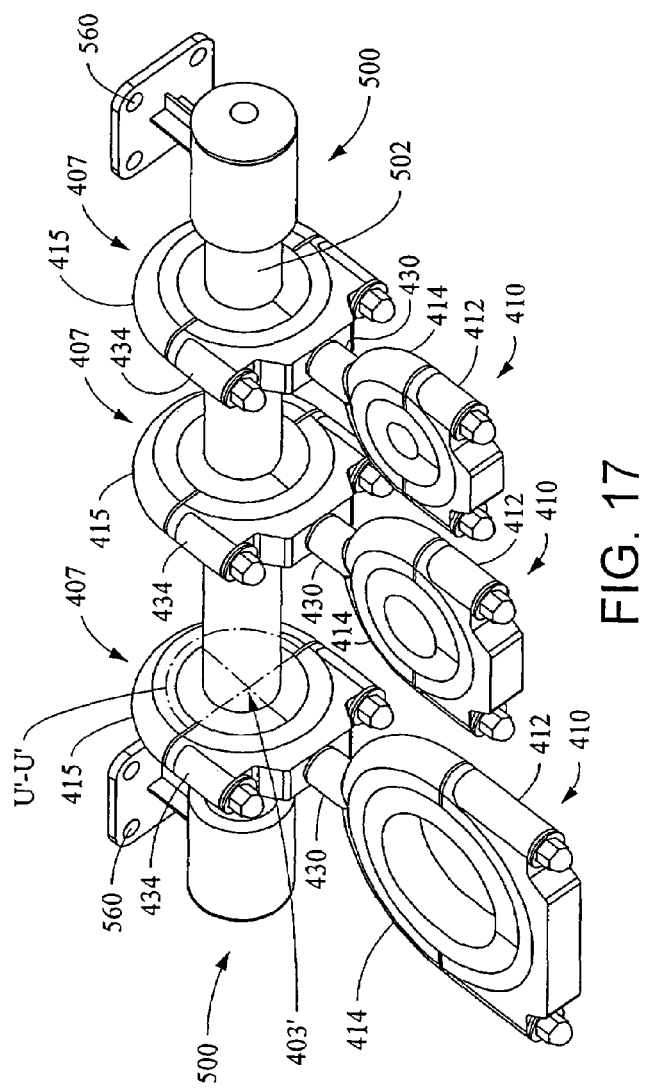
FIG. 17 is a perspective view of another embodiment of a conduit support of the present invention.
Figure 19:
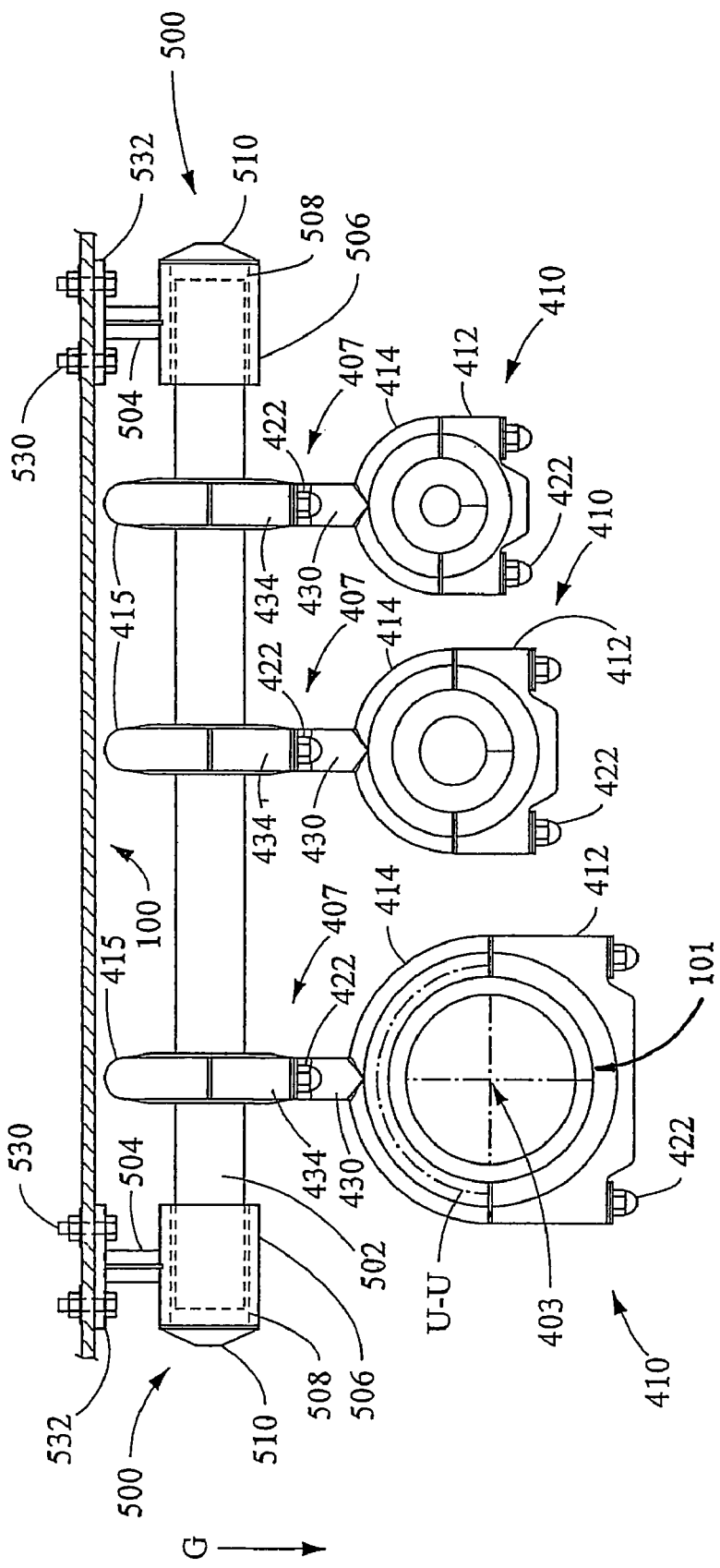
FIG. 19 is a side view of the conduit support of FIG. 17 attached to a support structure such as a ceiling.

Another embodiment of the present invention is illustrated in FIGS. 17-19. This embodiment may include a plurality of conduit supports 410 that are coupled to modular conduit supports 407 which are supported on conduit support assembly 500 for supporting one or more conduits 101. In one embodiment, conduit support assembly 500 may simply comprise a length of conduit 502, or other pipe, etc. (which may be solid or hollow, round, square or otherwise) that is supported between a pair of stand off members 504. In one embodiment, the stand off members 504 may comprise a cap member 506 that has a bore 508 therein sized to receive the end of the conduit 502 as shown. The terminal ends 510 of the cap members 506 may be substantially frusto-conically shaped such that when the standoff members 504 are suspended from a support structure 100, no substantially horizontal surface is presented where errant dust, dirt or debris, etc. may accumulate due to gravity. In one embodiment, each cap member 506 may be attached to a support structure 100 by stand off members 504. Terminal ends 510 may also be threadably secured to cap member 506 to allow for removal of terminal ends 510. Stand off members 504 may be integrally formed with their respective cap members 506 or otherwise attached thereto by, for example, welding, gluing, etc. Stand off members 504 may also be releasably attached with their respective cap members 506 or otherwise attached thereto by, for example, threads, snap-locks, etc. Each stand off member 504 may have a standoff base 532 that has at least one fastener hole 560 for receiving a fastener 530 therethrough to affix the standoff base 532 to the support structure 100. In other embodiments, standoff members 504 may be fastened to support structure 100 by a myriad of other methods such as welding, gluing, etc.

As can be seen in FIG. 19, the standoff members 504 may serve to orient the cap members 506 and conduit 502 in a spaced-apart relationship relative to the support structure 100 such that modular conduit supports 407 may be received on conduit 502 as shown. It will be appreciated that standoff members 504 may be of varying lengths and may be shaped in various configurations, such as for example hollow tubes, telescoping members, etc.

In this embodiment, a plurality of modular conduit supports 407 may be mounted on conduit 502 as shown. As discussed with respect to other embodiments, fasteners 422 may be utilized to secure the first and third members 415, 434 together around conduit 502. When modular conduit support 407 is secured to support structure 500, conduit support 410 may then be secured to modular conduit support 407 by an interconnecting member 430 or other fastener. Apex area 430 of second member 414 of a conduit support 410 may be threaded, similar to apex area 230, to releasably couple to third member 434. In a similar fashion, third member 434 may be threaded, similar to third member 234, to releasably couple to apex area 430. First members 412 may then be coupled to second members 414 to support conduits 601 in the manners described above and as illustrated in FIG. 20.

In one embodiment, the upper surfaces of second members 414, 415 may be generally convex and smooth in texture, generally anywhere from about a 100 RA finish to about a 5 RA finish, and may be fabricated from, for example, steel, stainless steel, plastics, polymers, rubber, etc. The smooth finish on the upper surface prevents recesses, crevasses and other areas that may encourage the accumulation of dust, dirt, debris, cleaning fluids, etc. The smoother the finish, i.e. 5 RA, the fewer places on the upper surfaces of second members 414, 415 that such contaminants may accumulate. This smooth texture may also be accomplished by utilizing coatings on the surfaces such as, for example, chrome plating, plastics, etc. This configuration defines a substantially uninterrupted curved convex outer surface having virtually no horizontally extending portion that would permit the accumulation of dust, dirt, debris, etc. due to gravity when the second members 414, 415 are coupled to the first and third members 412, 434. More specifically, each upper surface may be arcuately shaped as shown in FIGS. 17-20. This shape provides a curved surface about central axes T-T, for conduit support 410, and T'-T', for modular conduit support 407, that extend through center points 403, 403', respectively, and radial axes U-U, U'-U', respectively, that extend radially about the center points 403, 403', respectively. The upper arcuate surfaces of second members 414, 415 may generally abut the outer surfaces of first members 412, 434 when supporting conduit 601. As can be seen in the Figures, the upper surfaces of second members 414, 415 may face opposite to the direction of the pull of gravity (represented by the arrow "G" in FIG. 19). Second members 414 may additionally have apex areas 430 protruding therefrom to facilitate attachment to the modular conduit supports 407 in the manner described above. Thus, when errant particles or debris under the influence of gravity fall toward the ground, the upper convex surface due to its shape and texture does not afford a surface upon which dirt, debris, etc. may accumulate.

Figure 20:
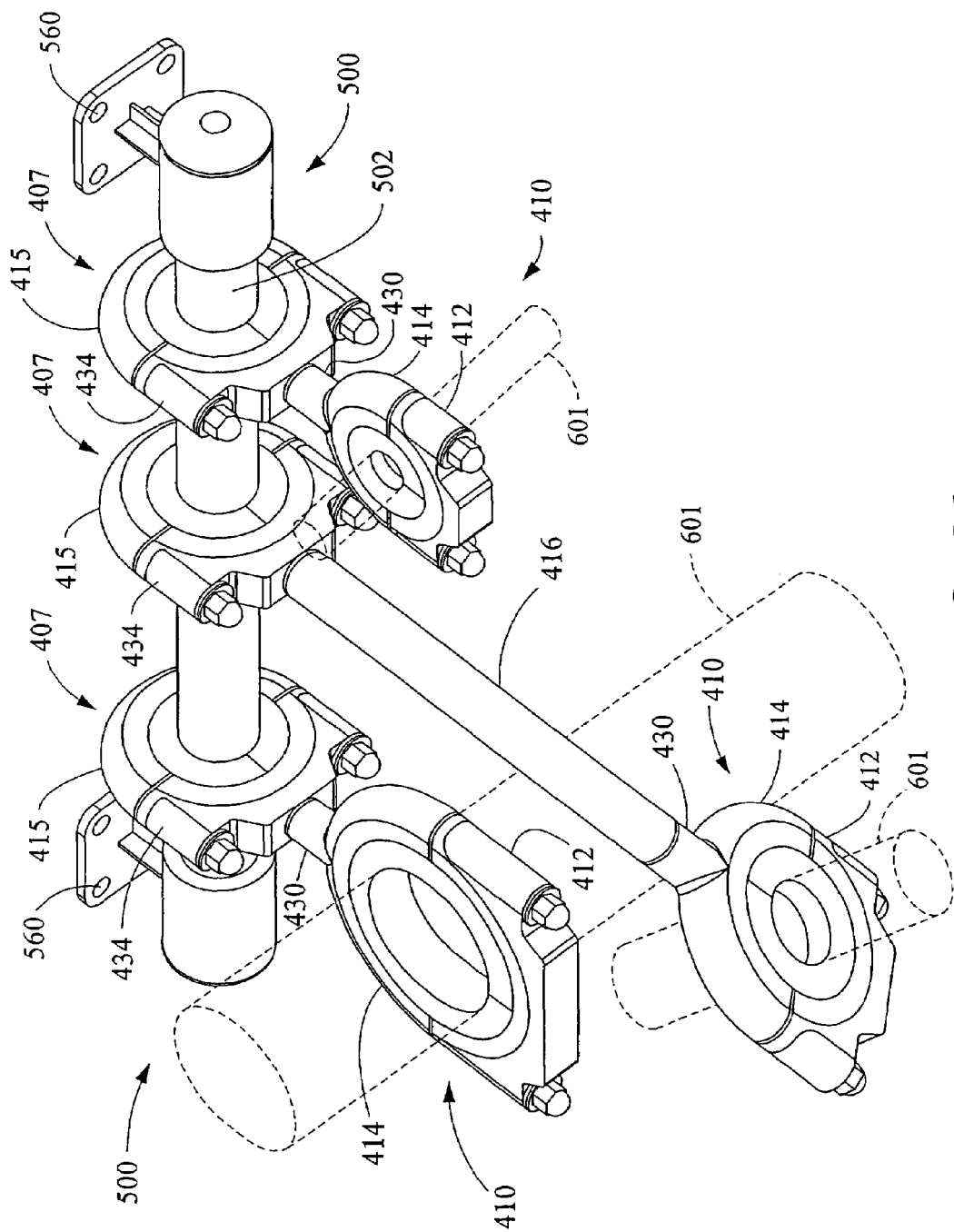
FIG. 20 is a perspective view of another embodiment of a conduit support of the present invention showing a plurality of conduit supports, which are shown in shadow lines, at varying angles and spaced relationships to each other.

As shown in FIG. 20, conduit supports 410 may be oriented in different directions from each other and different distances from conduit 502. Thus, the conduits 601 may be oriented in differing directions. As can be seen in FIG. 20, a support member 416 may be positioned between apex area 430 and third member 434. The support member 416 may provide additional clearance for conduit support 410 such that the conduits 601 do not intersect one another. Support member 416 may be provided in a myriad of lengths and in many differing orientations. To facilitate such arrangements, the support members 416 may be constructed in a variety of manners and configurations.

Figure 21:
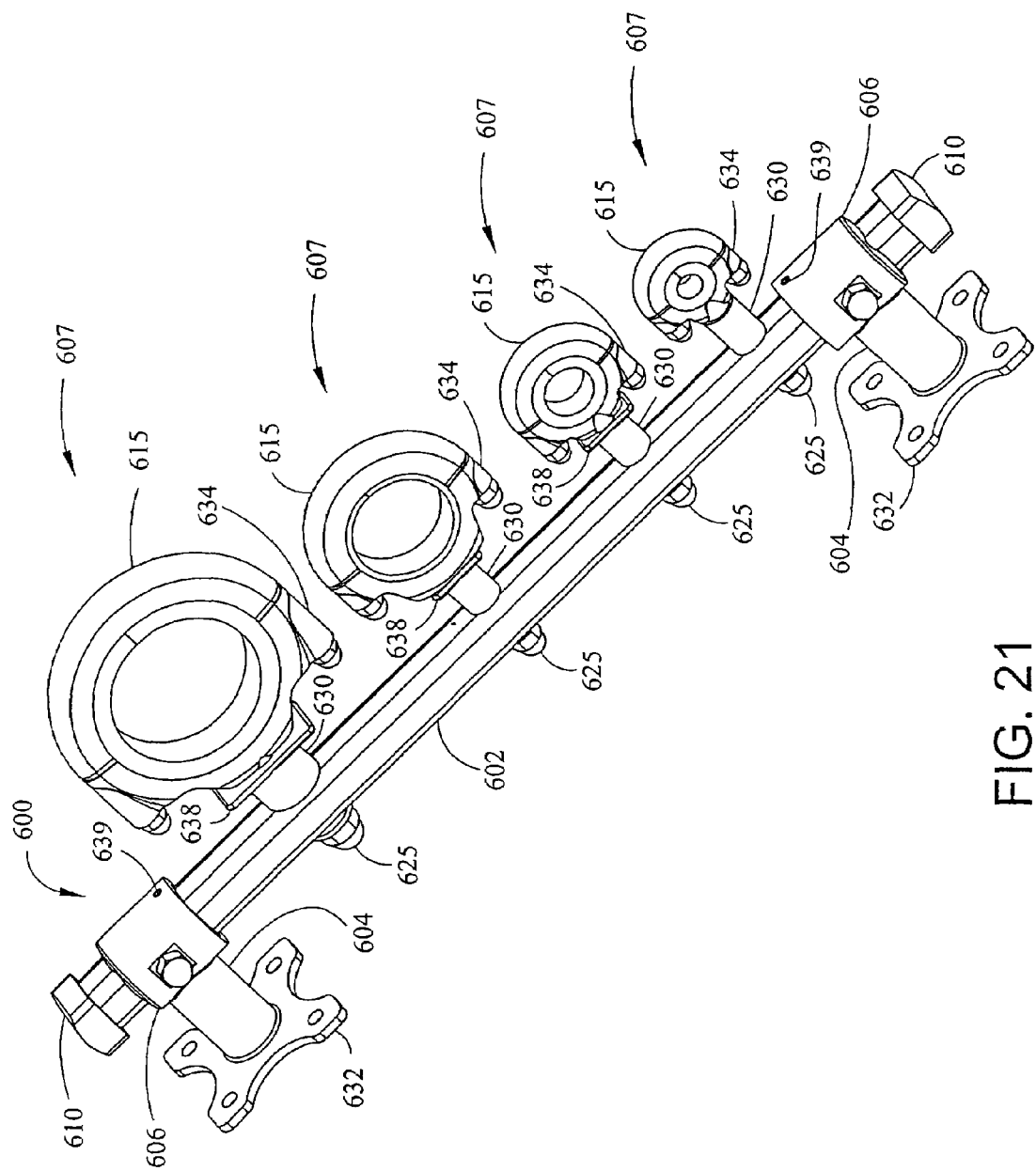
FIG. 21 is a perspective view of another embodiment of a conduit support of the present invention showing a plurality of conduit supports supporting conduits.
Figure 22:
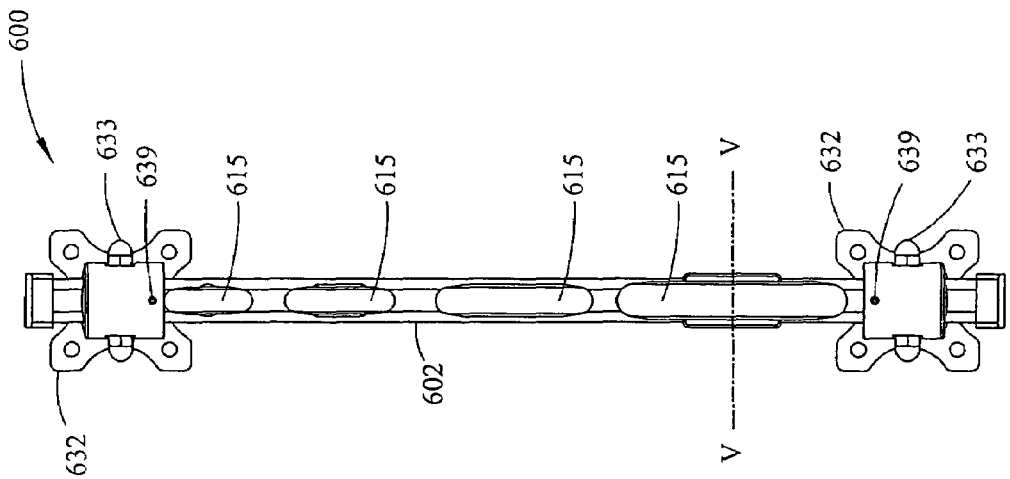
FIG. 22 is a front view of the conduit support of FIG. 21.
Figure 23:
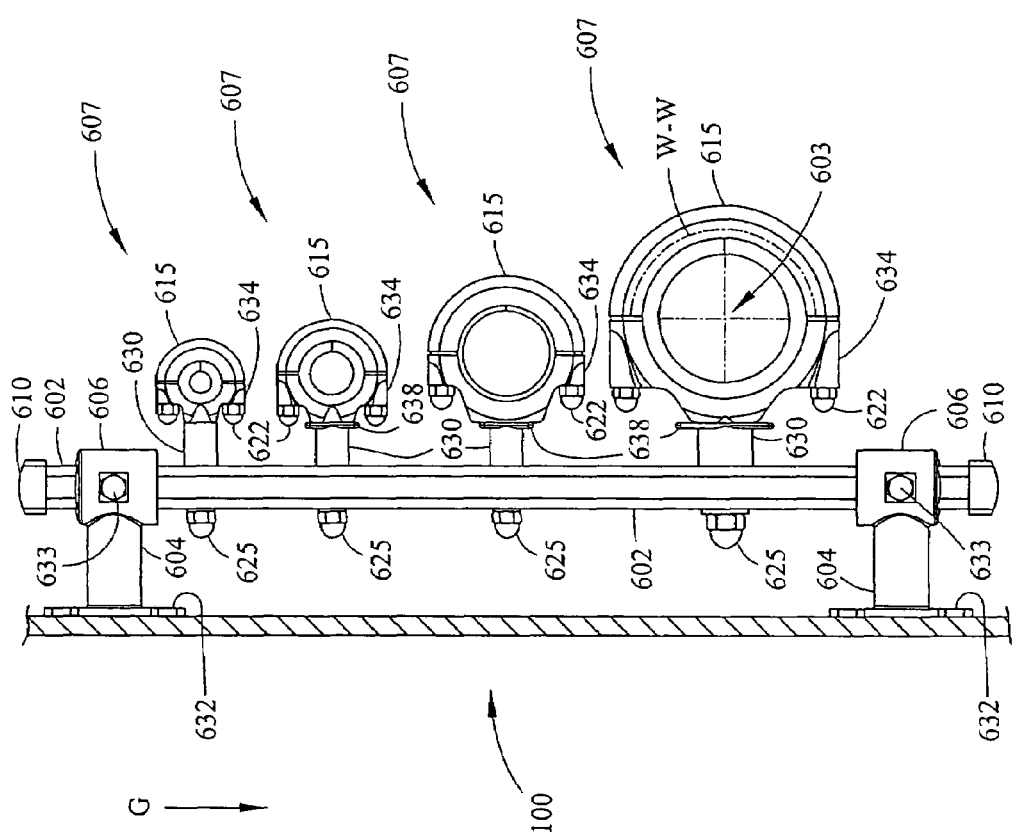
FIG. 23 is a side view of the conduit support depicted in FIG. 21 attached to a support structure such as a vertical wall.

FIGS. 21-23 illustrate yet another embodiment of the present invention. This embodiment may include a plurality of modular conduit supports 607 which are supported on conduit support assembly 600. In one embodiment, conduit support assembly 600 may simply comprise a length of square conduit 602, or other pipe, bar, etc. (which may be solid or hollow, round, square or otherwise) that is supported between a pair of stand off members 604. The stand off members 604 may have a cylindrical support member 606 that is sized to receive the end of the conduit 602 as shown. Conduit 602 may be slidably coupled to support member 606 and generally held in desired position by set screws 639. Therefore, the conduit system illustrated in FIGS. 21-23 is capable of repositioning while the set screws 639 are loosened as desired.

Once the conduit 602 is in a desired position as secured by the set screws 639, the conduit 602 may be permanently affixed to support member 606 by bolting a threaded stud (not shown) with fasteners 633 such that no threads are exposed. Other ways to secure the support member 606 to conduit 602 may be provided such as, for example, bolting, welding, gluing, etc. The cap members 610 may be rounded in shape such that when the standoff members 604 are attached to a support structure 100, no substantially horizontal surface is presented where errant dust, dirt or debris, etc. may accumulate due to gravity. In one embodiment, each support member 606 is attached to the stand off members 604, which is attached to a base 632 that may be attached to a support structure 100 by bolting, welding, gluing, etc. Base 632 may also be affixed to a support structure 100 in a myriad of other ways without departing from the spirit and scope of the invention. Cap members 610 may also be threadably secured to conduit 602 to allow for removal or replacement of cap members 610. Stand off members 604 may be integrally formed with their respective support members 606 or otherwise attached thereto by, for example, welding, gluing, etc. Stand off members 604 may also be releasably attached with their respective support members 606 or otherwise attached thereto by, for example, welding, threads, snap-locks, etc. Support member 606 may also be a single cast portion incorporating stand off member 604 and base 632.

As can be seen in FIG. 23, the standoff members 604 may serve to orient the support members 606 and conduit 602 in a spaced-apart relationship relative to the support structure 100 such that modular conduit supports 607 may be received on conduit 602 as shown. It will be appreciated that standoff members 604 may be of varying lengths and may be shaped in various configurations, such as for example hollow tubes, telescoping members, etc.

In this embodiment, a plurality of modular conduit supports 607 may be mounted on conduit 602 as shown. Fasteners 625 may be utilized to secure the third members 634 together with conduit 602. When modular conduit support 607 is secured to support structure 600, interconnection member 630 may be secured to the conduit 602 by a threaded engagement or other fastening means. The lower portion of third member 634 of the modular conduit support 607 may be threaded to releasably couple to the conduit 602. Between the interconnection member 630 and the third member 634, a stabilizing plate 638 may be employed. The plate 638 may have rounded edges to prevent the accumulation of dust, dirt, debris, etc.

In one embodiment, the upper surfaces of second members 615 may be generally convex and smooth in texture, generally anywhere from about a 100 RA finish to about a 5 RA finish, and may be fabricated from, for example, steel, stainless steel, plastics, polymers, rubber, etc. The smooth finish on the upper surface prevents recesses, crevasses and other areas that may encourage the accumulation of dust, dirt, debris, cleaning fluids, etc. The smoother the finish, i.e. 5 RA, the fewer places on the upper surfaces of second members 615 where such contaminants may accumulate. This smooth texture may also be accomplished by utilizing coatings on the surfaces such as, for example, chrome plating, plastics, etc. This configuration defines a substantially uninterrupted curved convex outer surface having virtually no horizontally extending portion which could permit the accumulation of dust, dirt, debris, etc. due to gravity when the second members 615 are coupled to the third members 634. More specifically, each upper surface may be arcuately shaped as shown in FIGS. 21-23. This shape provides a curved surface about a central axis V-V that extends through a center point 603 and a radial axis W-W that extends radially about center point 603. The upper arcuate surfaces of second members 615 may generally abut the rounded outer surfaces of third members 634 when supporting conduit. As can be seen in the Figures, the upper surfaces of second members 415 may face opposite to the direction of the pull of gravity or perpendicular to the direction of gravity (represented by the arrow "G" in FIG. 23). Thus, when errant particles or debris under the influence of gravity fall toward the ground, the upper rounded surfaces of modular conduit support 607 and support structure 600 do not afford a surface upon which dirt, debris, etc. may accumulate.

FIGS. 24-26A illustrate another embodiment of the present invention which includes a conduit support 710 comprising a support member 716 that is releasably secured to a second member 714 on one end and is releasably secured to a support structure 100 by nut 725 on the opposite end. The support member 716 may have a threaded end 736 that is sized to be threadedly received in a threaded bore 733 in the second member 714. In addition, a sloping seal 728 fabricated from silicone or other suitable sealant may be employed to establish a seal between support member 716 and second member 714. It will be appreciated that, except for the support member 716 and the sloping seal 728, the remaining structure of conduit support 710 is much the same as the conduit support 10 described above and illustrated in FIGS. 1-3A. The support member 716 utilizes the sloping seal 728 so that an uninterrupted surface can be provided that prevents the accumulation of errant dust, dirt, debris, cleaning fluids, etc. Although FIGS. 24-26A disclose a threaded engagement between the support structure 100 and the support member 716, other fastening means may be used such as, for example, welding, gluing, etc. Although support member 716 is shown in a straight vertical fashion, other embodiments may be implemented while remaining within the spirit and scope of the present invention such as, for example a curved shape or other configuration to avoid other pipe or obstacles.

Figure 27:
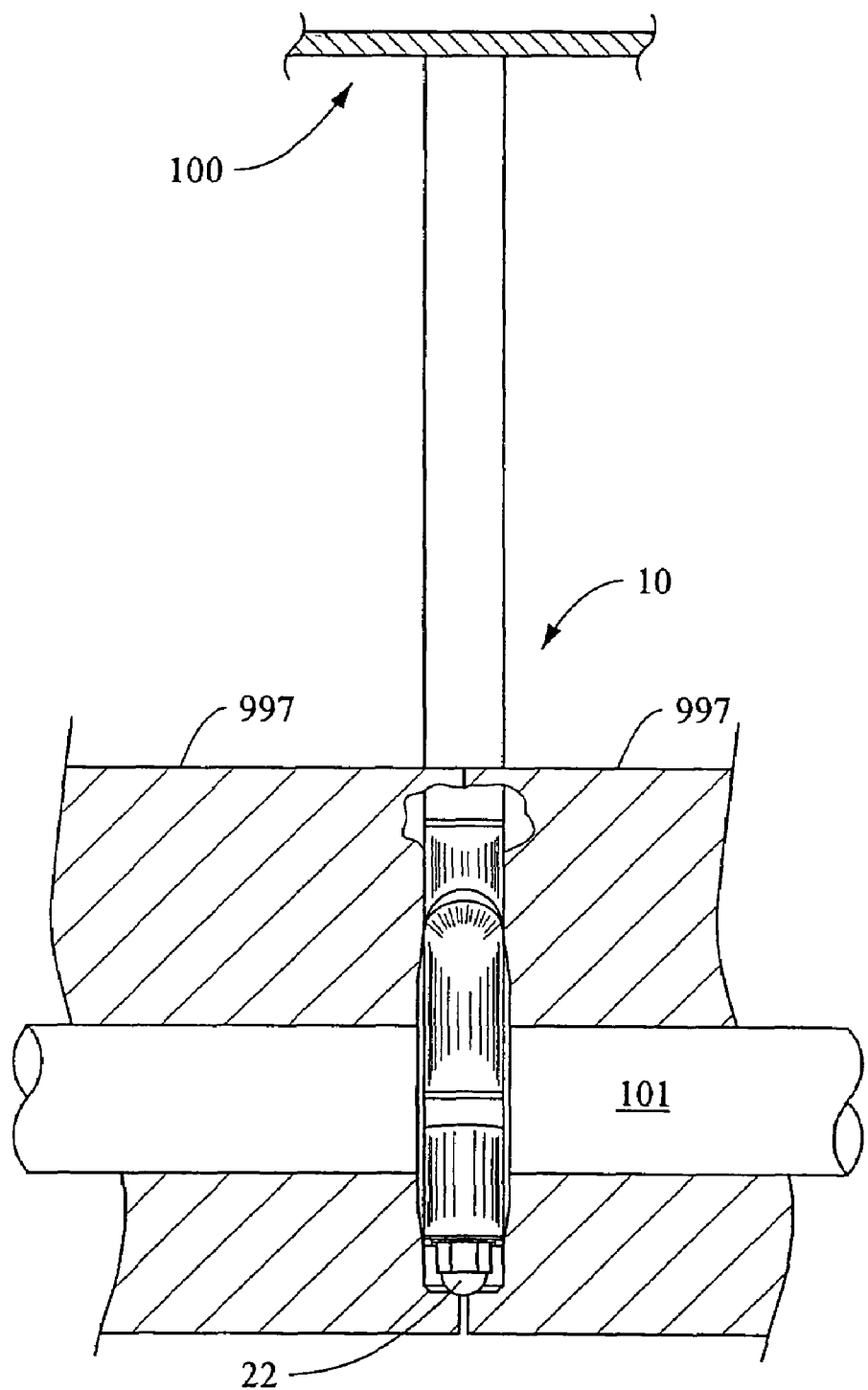
FIG. 27 is a cross-sectional view of an embodiment of the present invention wherein insulation is employed to encapsulate a conduit support of the present invention.

Another embodiment of the present invention is illustrated in FIG. 27, which shows the insulating of a conduit support 10 that is supporting a pipe 101. FIG. 27 illustrates the new method of insulation, which is made possible when used in combination with the present invention. As can be seen in the drawing, only one separation is required in the insulation 997 wherein it surrounds the entire conduit support 10 and the conduit 101. This is made possible because of the sanitary nature and design of the conduit support 10. The insulation 997 is separated about a single seam located generally about the outer circumference of the conduit support 10 which allows access to the fasteners 22 of the conduit support through the seam. This method is clearly advantageous over the prior methods as the entire conduit support 10 may be enclosed within the insulation 997 without losing the sanitary properties of the combination and further only requiring a single cut in the insulation to accommodate access to the conduit support 10. Having the entire conduit support 10 thus enclosed in insulation 997 increases the sanitary nature of the combination and the insulating efficiency due to the lack of protruding conduit supporting structures.

The embodiments of the present invention have been described herein for use with generally known threaded connection members, i.e. threaded fasteners and threaded bores. These embodiments of the present invention could be successfully employed with a myriad of other types of fasteners and connecting members between the supports, conduit supports or other modular conduit supports without departing from the spirit and scope of the present invention such as, for example, welding, gluing, clamping, etc. One example of another fastener is illustrated in FIGS. 6 and 7 discussed above, utilizing self-locking snap fasteners to secure portion of the conduit support together. Other examples may include a dovetail arrangement wherein abutting portions of the conduit support connect via a male dovetail notch being received in a female dovetail slot with securing means such as, for example, a set screw. In addition, a keyed arrangement could be utilized wherein two abutting portions come together with a dual dove tailed key placed between the two in the female receiving slots and secured with, for example, a set screw. One such other embodiment may provide, for example, a pair of spring loaded snaps positioned flush on the outer front and rear surface of the first member 112 that self-lock flush into the outer front and rear surfaces of second member 114. Thus, the scope of protection afforded to these embodiments of the present invention are not limited to use with the specific types of fasteners illustrated in the Figures.

The embodiments of the present invention have been described herein for use in connection with conventional conduit of the type depicted in shadow in FIG. 1. The skilled artisan will readily appreciate, however, that these embodiments of the present invention could be successfully employed with a myriad of other types of conduit, pipes, bars and materials without departing from the spirit and scope of the present invention. Thus, the scope of protection afford to these embodiments of the present invention is not limited to use in connection with the specific type of conduit support depicted in the Figures. Other combinations of conduit supports described herein, although not illustrated in the drawings, are within the scope of the present invention.

The embodiments of the present invention represent significant improvements over prior pipe hanging devices. Due to its sanitary nature, the present invention is well suited for use by manufacturers of goods requiring such an environment. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. A method of supporting at least one conduit in a sanitary environment, said method comprising:
   suspending a first conduit support from a structure such that the conduit support does not present horizontal surfaces whereon contaminants are able to accumulate thereon due to gravity;
   supporting a portion of a conduit within the conduit support;
   suspending a second conduit support from the structure such that the second conduit support does not present another horizontal surface whereon other contaminants are able to accumulate thereon due to gravity;
   supporting another portion of the conduit within the second conduit support;
   suspending a third conduit support from one of the first and second conduit supports such that the third conduit support does not present another horizontal surface whereon other contaminants are able to accumulate thereon due to gravity; and
   supporting another portion of a second conduit within the third conduit support.

2. A method of supporting conduit in a sanitary environment, said method comprising:

supporting a first conduit support relative to a structure such that the conduit support does not form a horizontal surface whereon contaminants are able to accumulate thereon due to gravity;

supporting a portion of a conduit within the conduit support;

supporting a second conduit support relative to the structure such that the second conduit support does not form another horizontal surface whereon other contaminants are able to accumulate thereon due to gravity;

supporting another portion of the conduit within the second conduit support;

suspending a third conduit support from one of the first and second conduit supports such that the third conduit support does not form another horizontal surface whereon other contaminants are able to accumulate thereon due to gravity; and supporting another portion of a second conduit within the third conduit support.

3. A method of supporting at least one conduit in a sanitary environment, said method comprising:

clamping a portion of a conduit within a conduit support such that no debris-catching recesses are presented in the conduit support or are formed between the conduit support and the portion of conduit clamped therein;

suspending the conduit support from a structure with a support member protruding from the conduit support such that no exposed horizontal surfaces or debris-catching recesses are presented;

suspending a second conduit support from the structure such that the second conduit support does not present another horizontal surface whereon other contaminants are able to accumulate thereon due to gravity;

supporting another portion of the conduit within the second conduit support;

suspending a third conduit support from one of the first and second conduit supports such that the third conduit support does not present another horizontal surface whereon other contaminants are able to accumulate thereon due to gravity; and supporting another portion of a second conduit within the third conduit support.

4. A method of supporting at least one conduit in a sanitary environment, said method comprising:

clamping a portion of a conduit within a conduit support such that no debris-catching recesses are presented in the conduit support or are formed between the conduit support and the portion of conduit clamped therein;

suspending the conduit support from a structure with a support member protruding from the conduit support such that no exposed horizontal surfaces or debris-catching recesses are presented;

suspending a second conduit support from the structure such that the second conduit support does not form another horizontal surface whereon other contaminants are able to accumulate thereon due to gravity;

supporting another portion of a second conduit within the second conduit support;

suspending a third conduit support from one of the first and second conduit supports such that the third conduit support does not present another horizontal surface whereon other contaminants are able to accumulate thereon due to gravity; and supporting another portion of a third conduit within the third conduit support.

\* \* \* \* \*